Sept. 29, 1959 M. L. KUDER 2,907,011
AUTOMATIC INFORMATION SORTING SYSTEM
Filed June 28, 1957 13 Sheets-Sheet 8
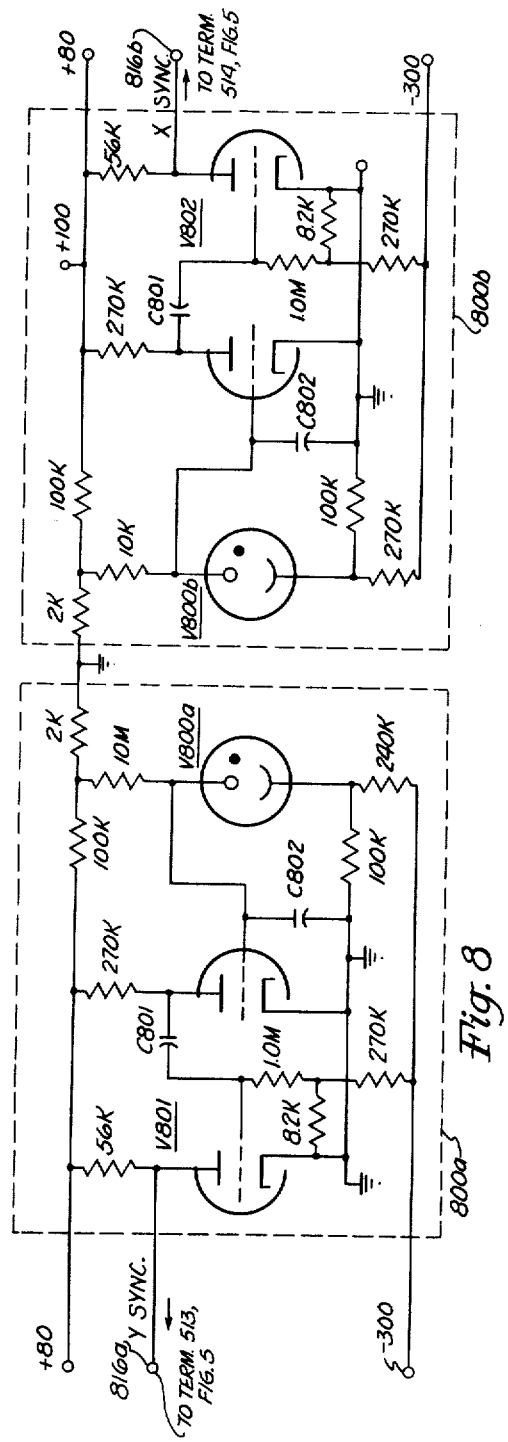
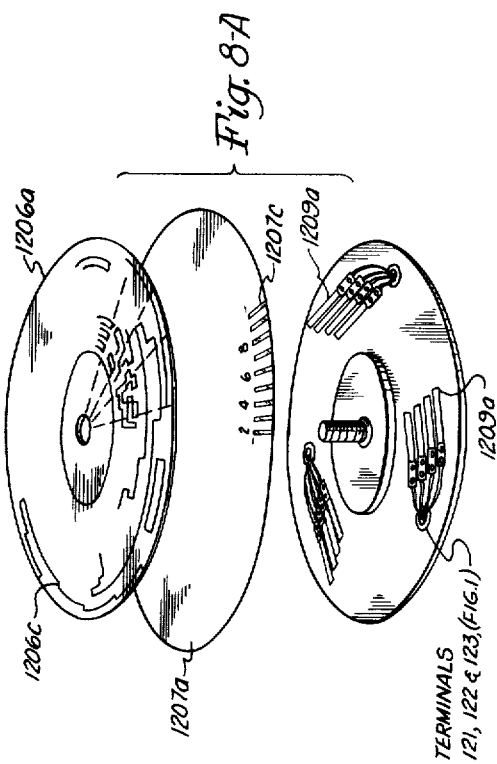
INVENTOR
Milton L. Kuder
BY Arthur Vinograd
Leonard F. Stoll ATTORNEYS

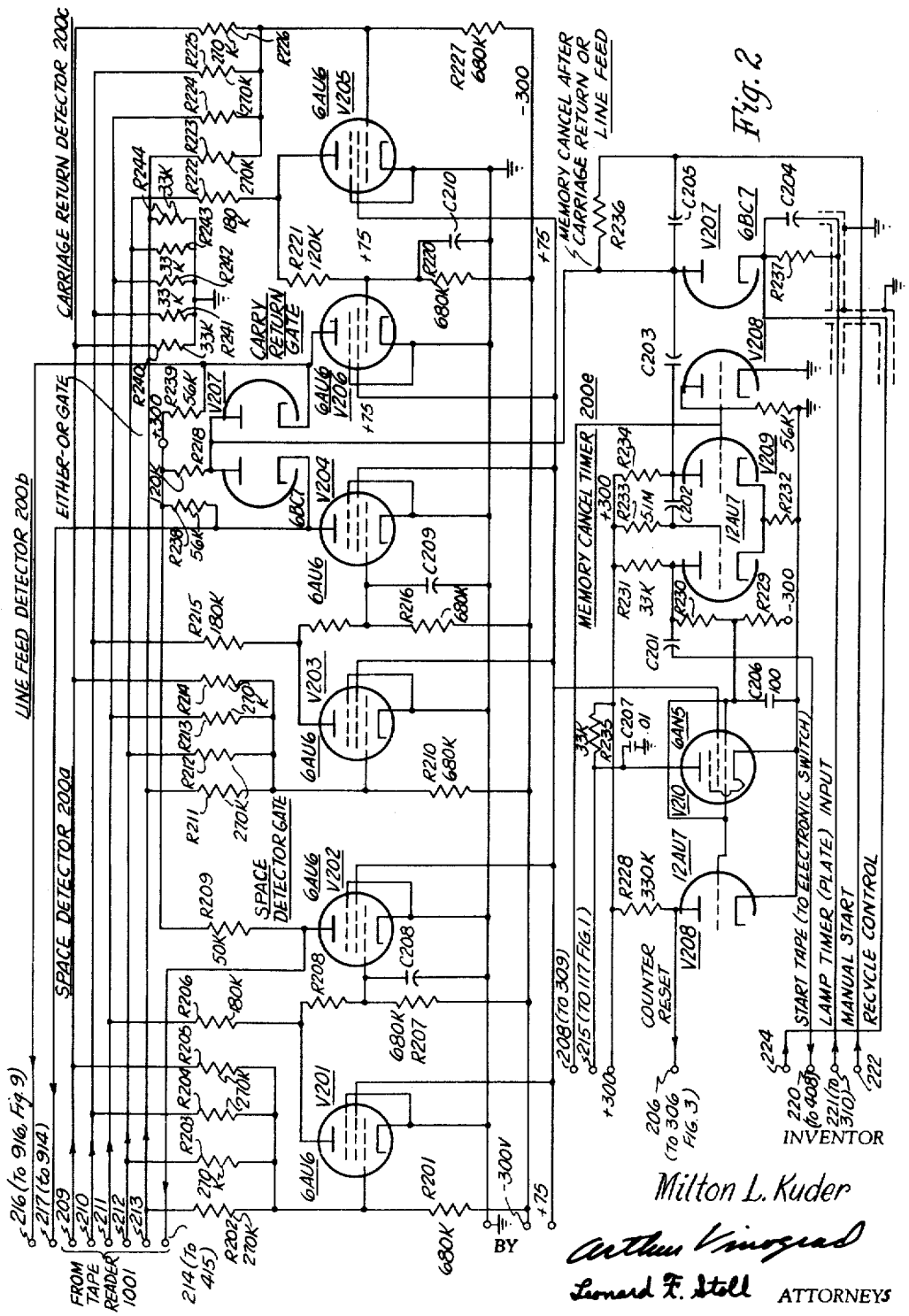

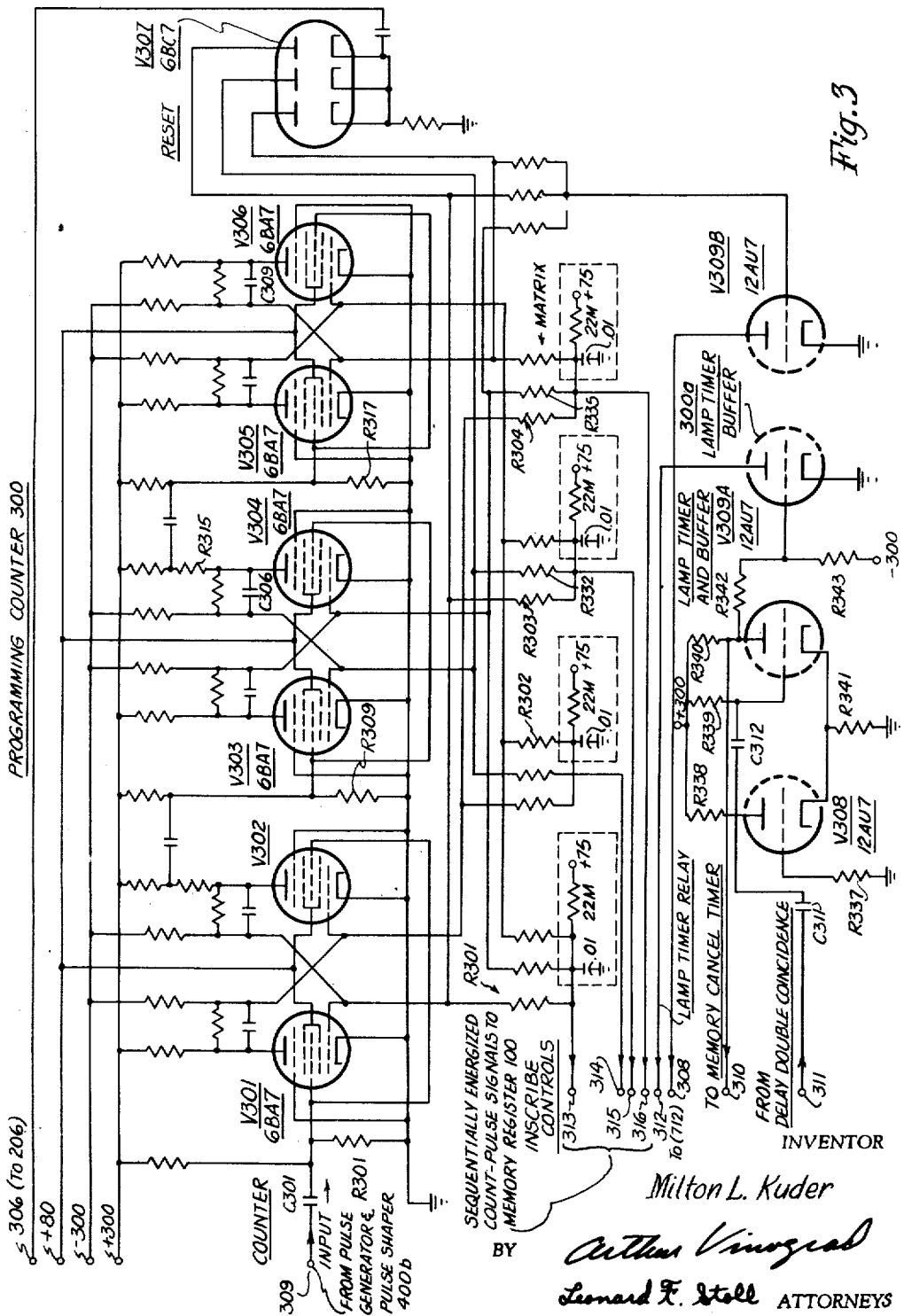

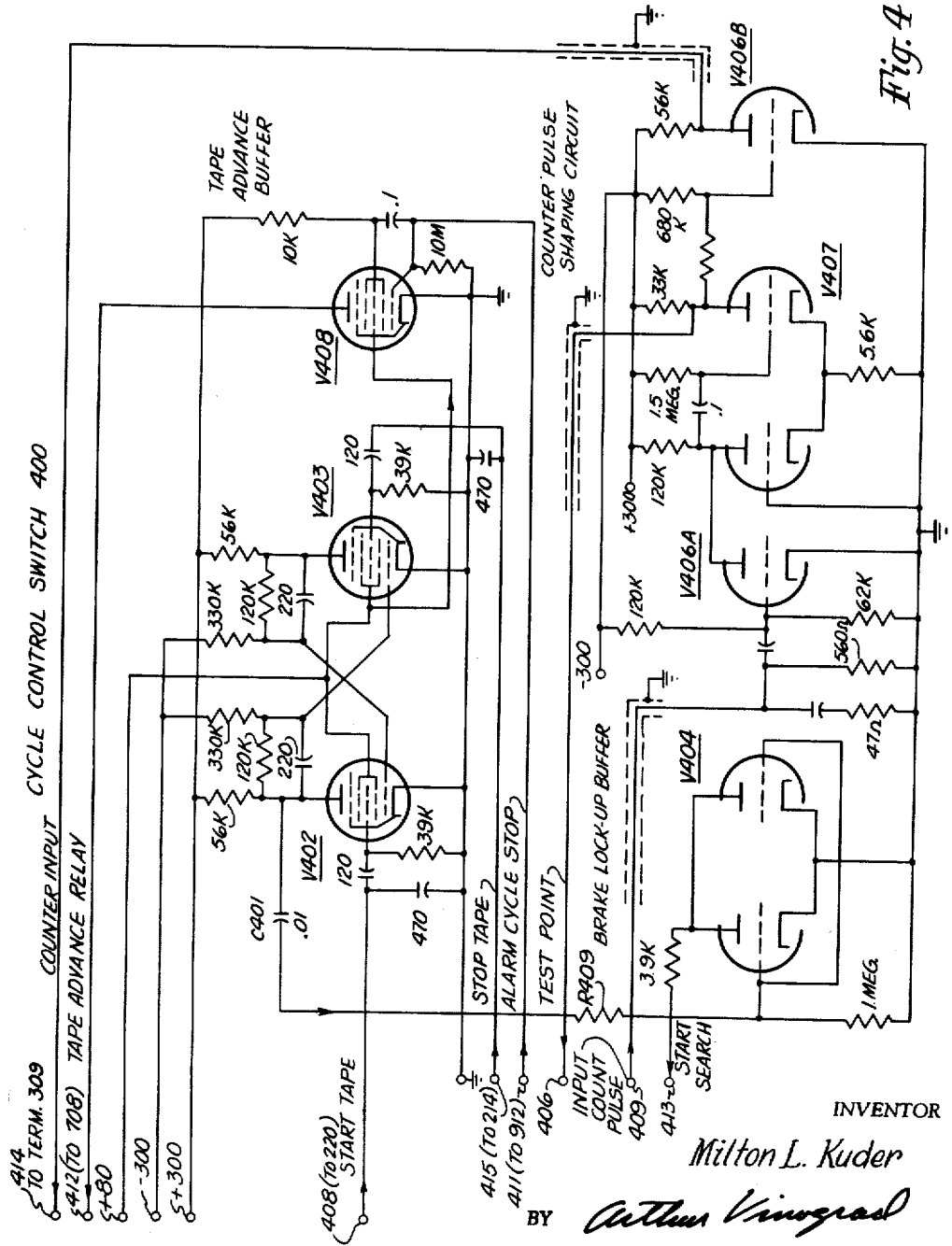

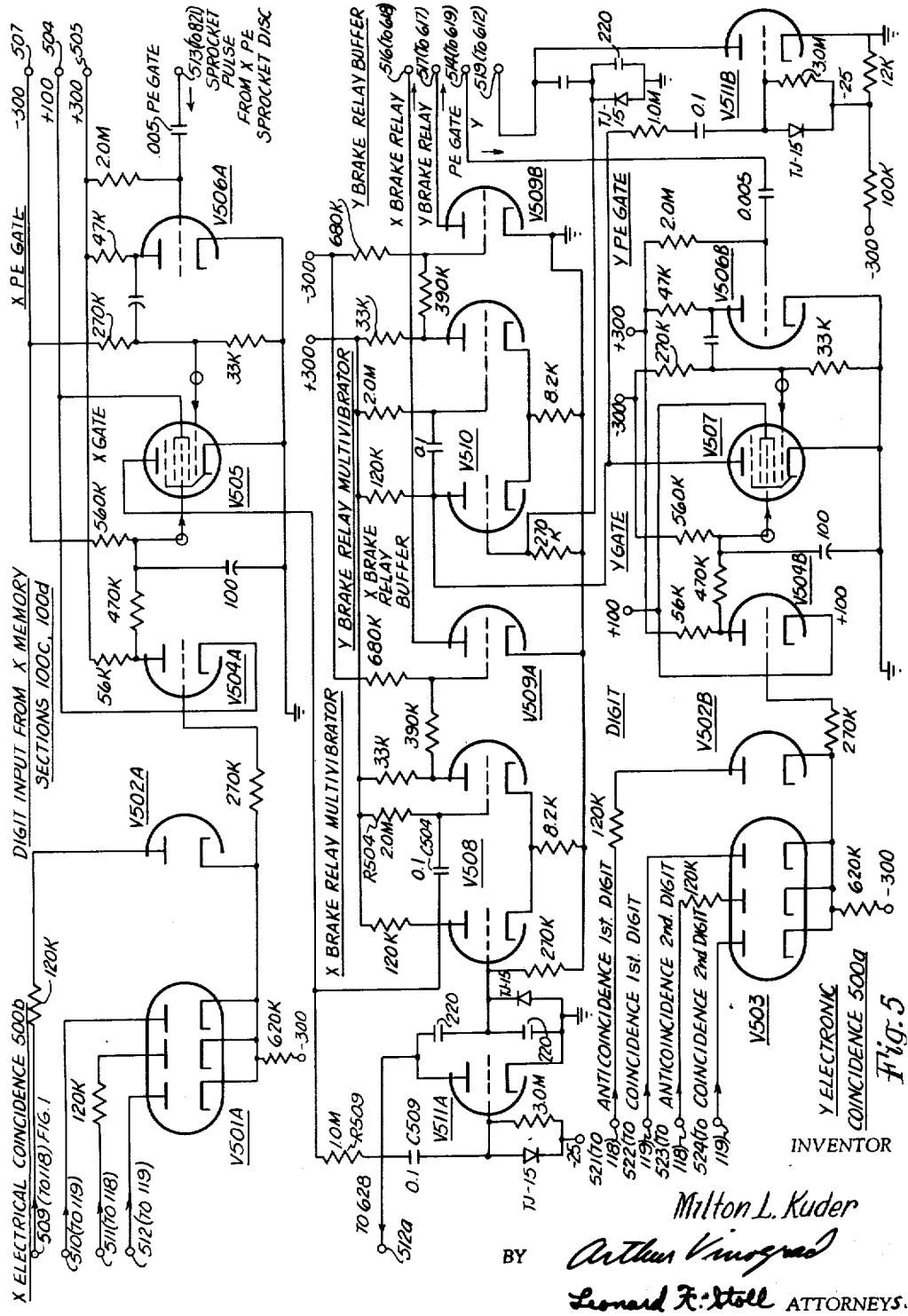

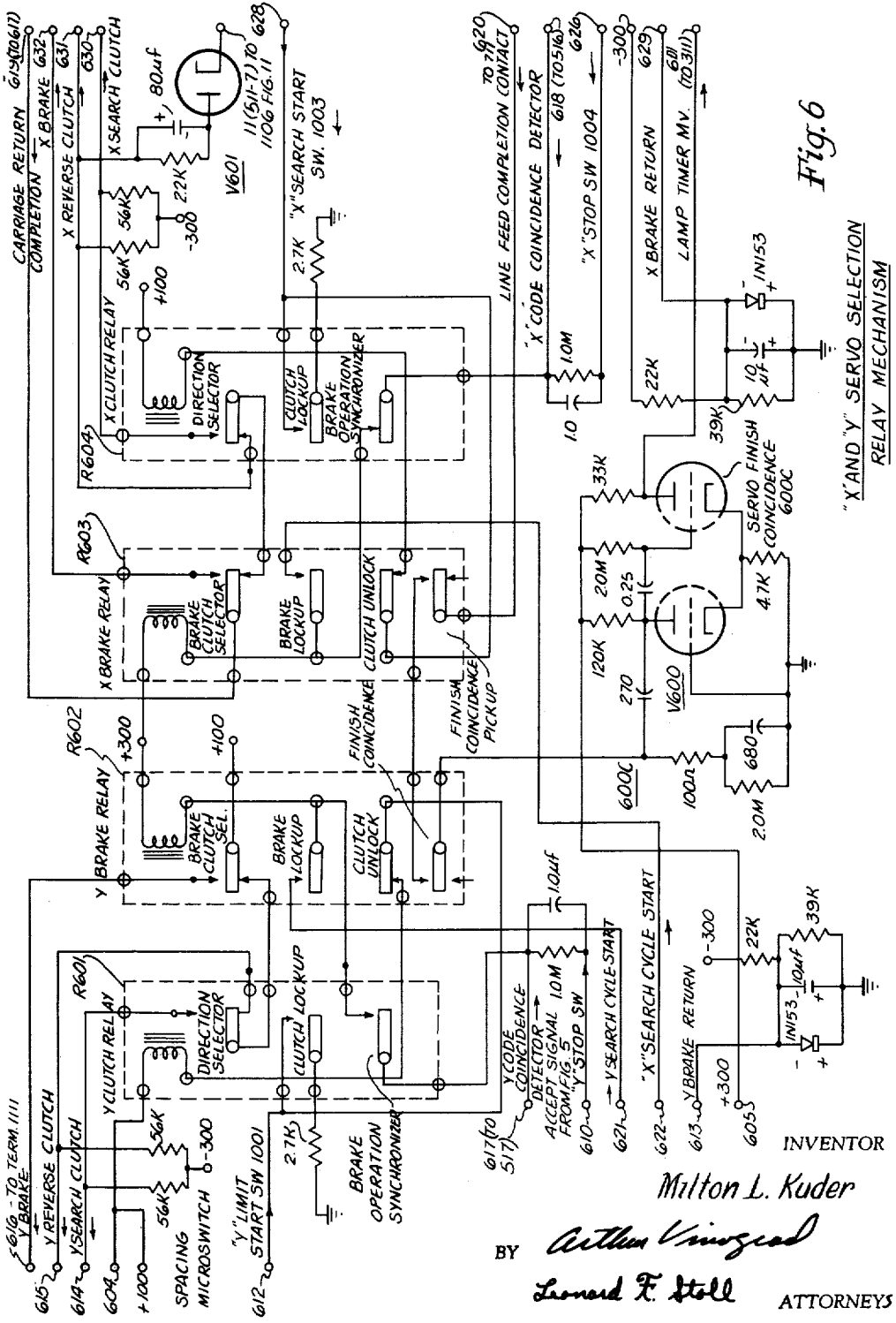

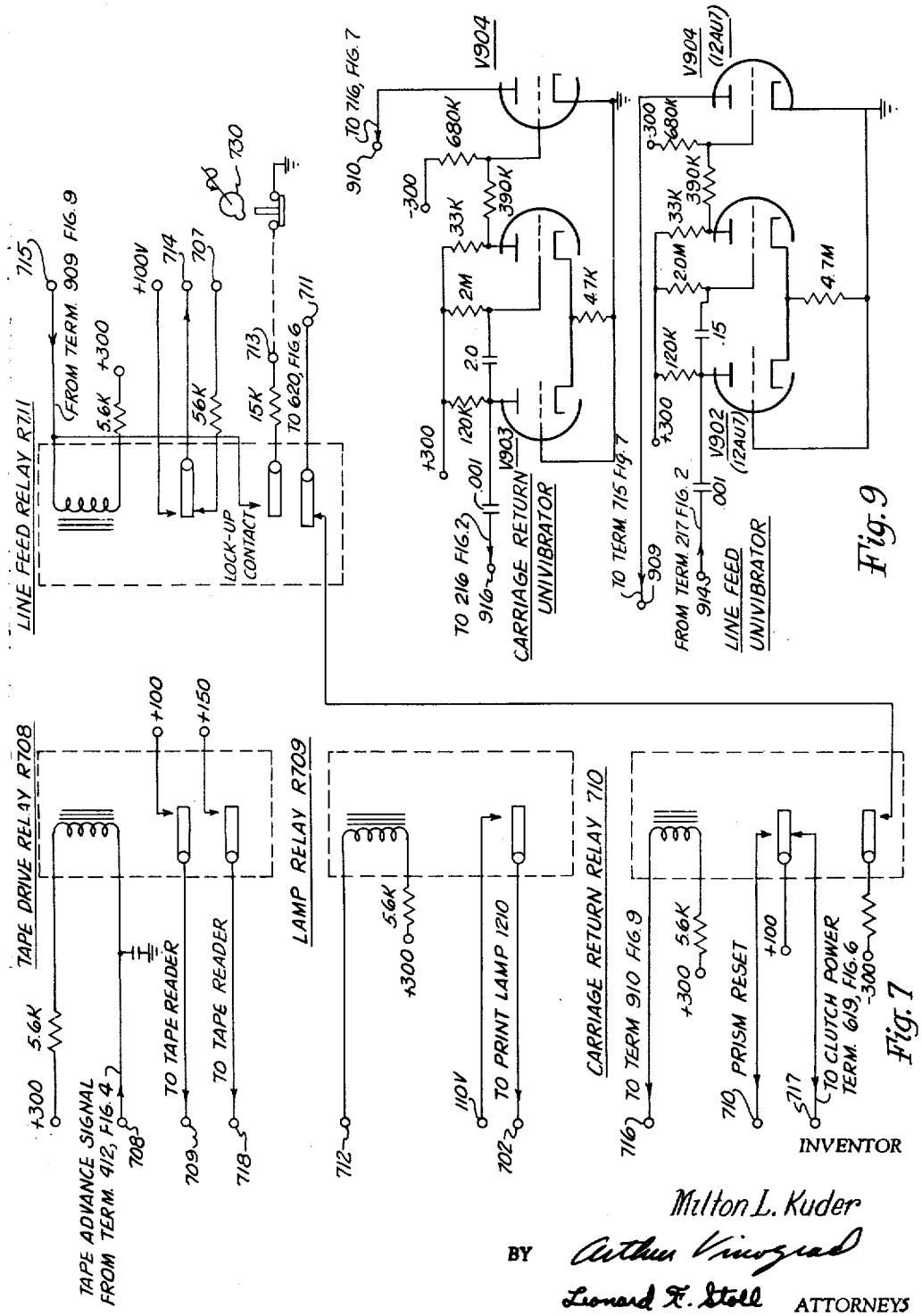

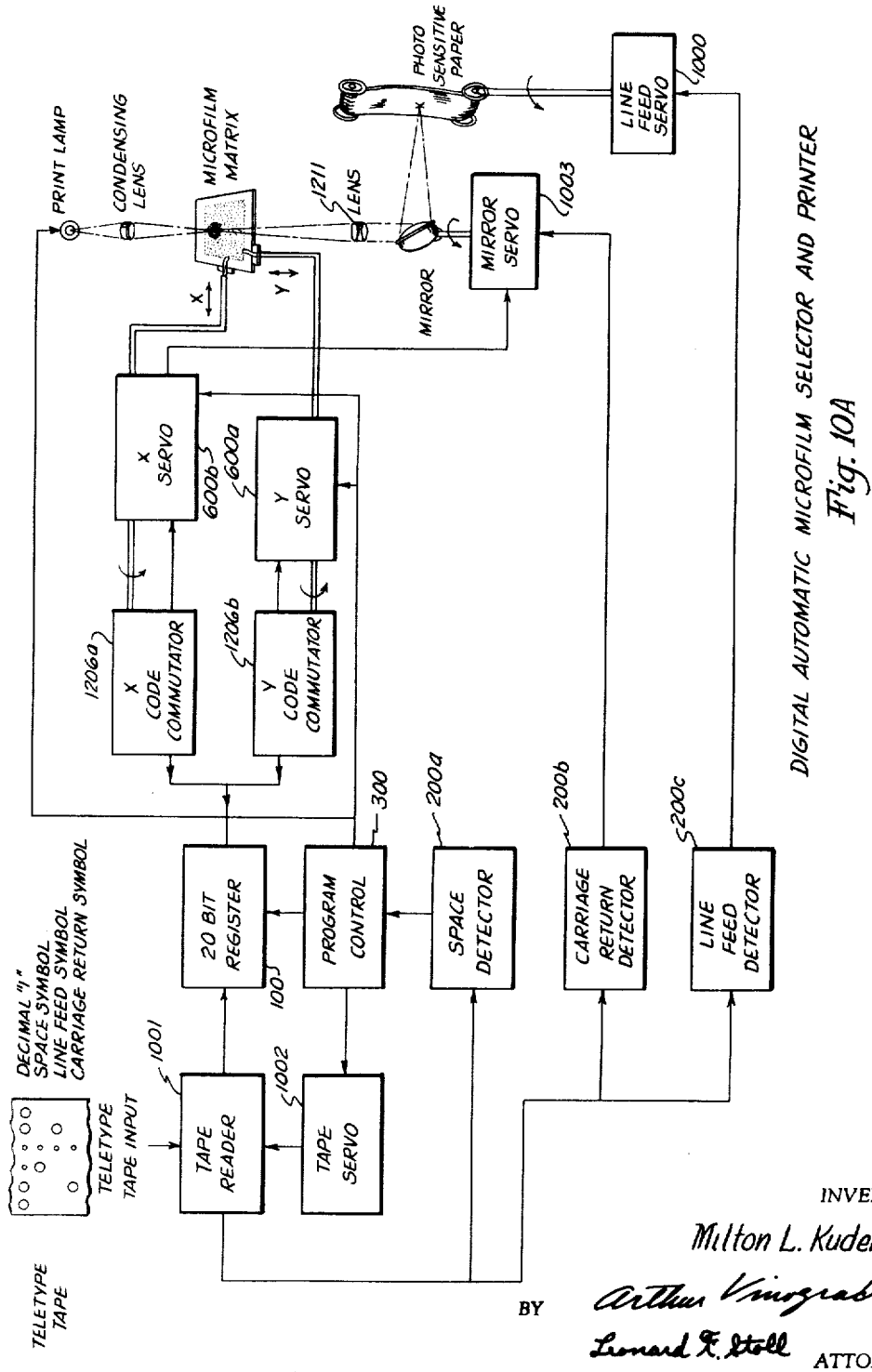

Sept. 29, 1959

M. L. KUDER 2,907,011

AUTOMATIC INFORMATION SORTING SYSTEM

Filed June 28, 1957

INVENTOR
Milton L. Kuder
BY Arthur Vinograd
Leonard F. Stoll ATTORNEYS

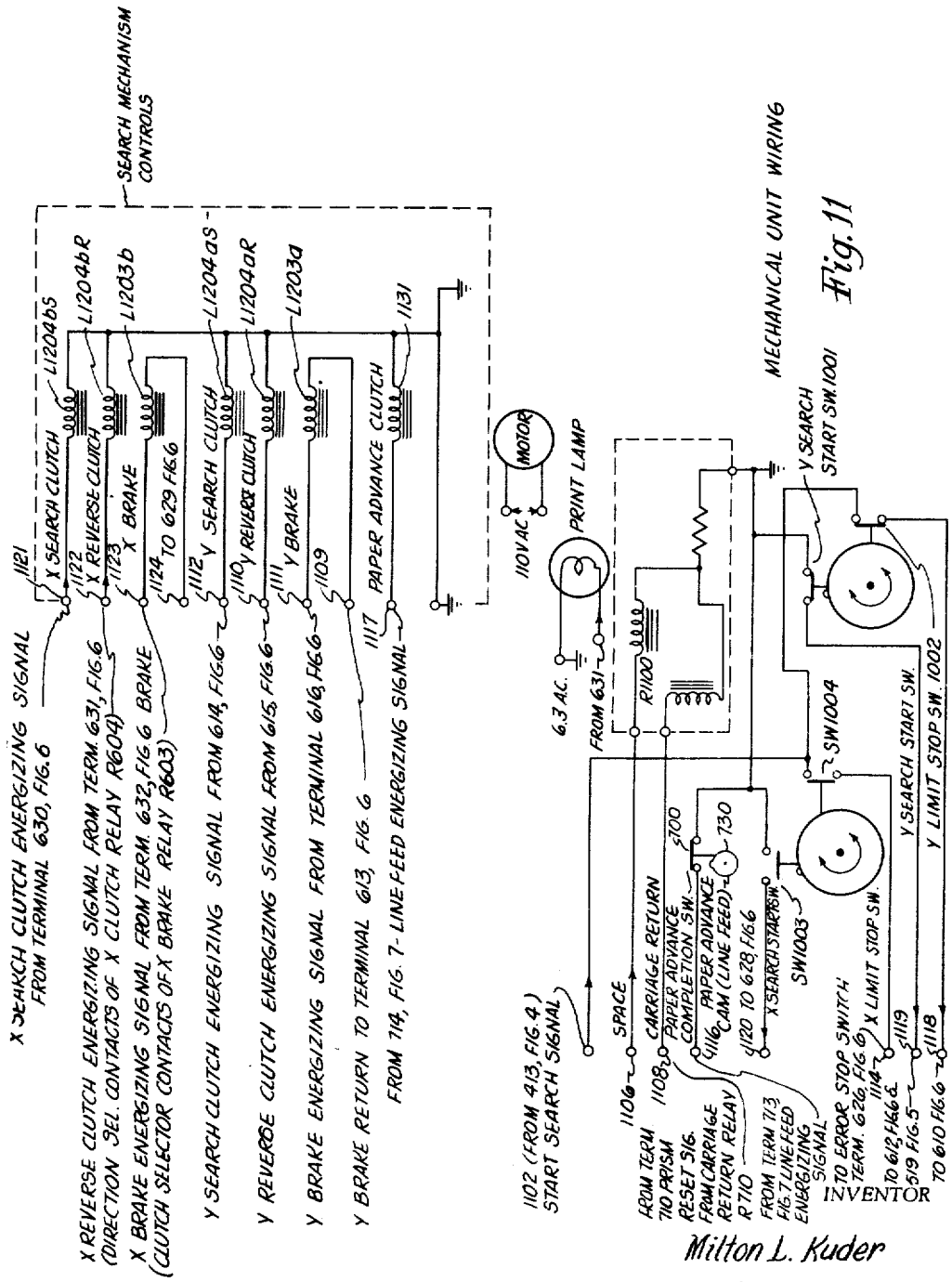

Sept. 29, 1959　　　M. L. KUDER　　　2,907,011
AUTOMATIC INFORMATION SORTING SYSTEM
Filed June 28, 1957　　　　　　　　　　　13 Sheets-Sheet 13

TIME-SEQUENCE DIAGRAM
FOR I CYCLE OF OPERATION

INVENTOR
Milton L. Kuder
BY
ATTORNEYS

United States Patent Office 2,907,011
Patented Sept. 29, 1959

2,907,011

AUTOMATIC INFORMATION SORTING SYSTEM

Milton L. Kuder, Washington, D.C., assignor to the United States of America as represented by the Secretary of Commerce Application June 28, 1957, Serial No. 668,827

16 Claims. (Cl. 340—174)

The present invention relates to information storage and retrieval systems and particularly contemplates an improved system for automatically searching records having stored information and retrieving selected information in the form of photographic reproductions. The mechanism of the present invention provides extremely rapid access to any one of as many as 10,000 information-containing store areas prerecorded in miniature on a matrix which may be in the form of a sheet of film. The instrument operates on a continuous basis, automatically searching the storage matrix and photographically printing out a selected frame of information every two seconds under a programming control.

The apparatus of the present invention is particularly applicable where large volumes of data are to be assembled in a predetermined sequence from a master random file. The information store areas on the storage matrix may be in the form of microfilmed pictures, drawings, finger prints, sets of numbers, letters, or other symbols, or even single stages of electronic circuit diagrams. The quantity and type of data which may be prerecorded on the information storage matrix is limited only by the size of the individual frame and the photographic resolution of the film emulsion on which the prerecorded information is stored.

The programming control is applied as an input to the apparatus of the present invention by means of a conventional data inscribing device such as teletype tape containing, in perforated coded form, the locations of the desired frames in order in which they are to be printed out. Conventional teletype coding as indicated at the top of Fig. 10A provides a five-digit binary coded representation of the normal type of information provided on a teletype keyboard such as alphabetic letters, decimal numbers, and special symbols such as word space, line feed, carriage return, etc. Typical codings for a decimal "1," space symbol, line feed symbol, and carriage return symbol are exemplified in Fig. 10A. The assembled data output produced by the machine is preferably obtained on a strip of photosensitive paper of any required length. The information secured from the information storage matrix may be enlarged during the readout process by conventional optical techniques employing commercial automatic photo reproducing mechanisms.

It is accordingly an immediate object of the present invention to provide a high-speed information processing device which will sort out information according to a predetermined order from data which has been prerecorded in random fashion.

Another object of this invention is to provide a sorting system of the type in which a large amount of data has been stored in microfilm form and which will automatically locate and print-out a particular sequence of stored information in enlarged form.

The invention further contemplates servocontrol means for rapidly locating the discrete store areas on a storage matrix, in which the servomechanism is controlled by high-speed electronic digital type circuits for translating programming instructions into servocontrol signals.

A further object of this invention is to provide a device for locating a discrete store area on a storage matrix by positioning the matrix relative to a sensing means in directions corresponding to the geometrical coordinates defining the spatial position of said store area under the control of high-speed electronic digital circuitry.

An additional object of this invention is to provide an information retrieval system in which compatibility between applied programmed store area locating signals, and store area identifying signals articulated with the movements of an information storage matrix relative to a fixed origin point, functions to locate a selected store area.

A further object of this invention is to provide a search mechanism for positioning a storage matrix relative to a read-out station by motive means controlled by a digital pulse selection circuit.

The above objects and other objects to which reference will be made in the ensuing disclosure, are accomplished by a combination and arrangement developments and instrumentalities of which a preferred embodiment is illustrated in the accompanying drawings, in which Fig. 1 is a detailed circuit schematic of a digital memory and coincidence circuit employed in the present invention;

Fig. 2 is a circuit schematic detailing the special symbol detector mechanisms employed in the present invention;

Fig. 3 is a circuit diagram showing the construction of a programming sequence counter, matrix, and lamp-timer mechanism;

Fig. 4 is a circuit diagram of a cyclical control switch and counter pulse shaper circuit employed;

Fig. 5 shows the coincidence detectors for determining consonance between the instructional signals and the position of the storage matrix employed in connection with the present invention;

Fig. 6 is a circuit diagram of a control relay complex employed for operating the servoclutch and servobrake mechanisms;

Fig. 7 shows an auxiliary relay diagram for operating various components of the mechanism of the present invention;

Fig. 8 is a circuit of a synchronizing pulse circuit employed in connection with the search mechanism of the invention;

Fig. 8A shows the code and synchronizing pulse discs employed in connection with the information-storage positioning mechanism;

Fig. 9 shows the circuit construction of various special symbol control circuits employed;

Figs. 10A and 10B are block diagrams showing the over-all arrangement of the elements involved in the invention;

Fig. 11 is a wiring diagram showing the energizing circuits for the clutch, brake, power feed, and carriage-indexing mechanism and certain of the control switches;

The instrument of the present invention involves essentially the combination of digital computer type electronic circuitry and a precision servomechanism system. The servomechanism system is employed to search the X and Y coordinate axes of an information storage matrix containing microfilmed information frames or store areas. The location of each frame on the matrix can therefore be defined in terms of its X and Y coordinate positions with respect to a fixed origin as in indicated in Fig. 12A. Information defining the location of a desired frame or store area is fed into a binary register as a pattern of coded instruction signals by means of a programming device such as a teletype tape. A 20-bit word is employed to designate the coordinates defining the spatial position of the desired store area; 10 bits of the word being employed to define a first or Y coordinate and the remaining 10 bits being employed to define the other or X coordinate. The register employed comprises a capacitor-type memory and coincidence identification circuit. The first of the 10 referred-to information bits recorded in the register control the positioning of the search mechanism in the Y coordinate direction, while the second 10 bits control the X positioning of the search mechanism.

Figure 12:
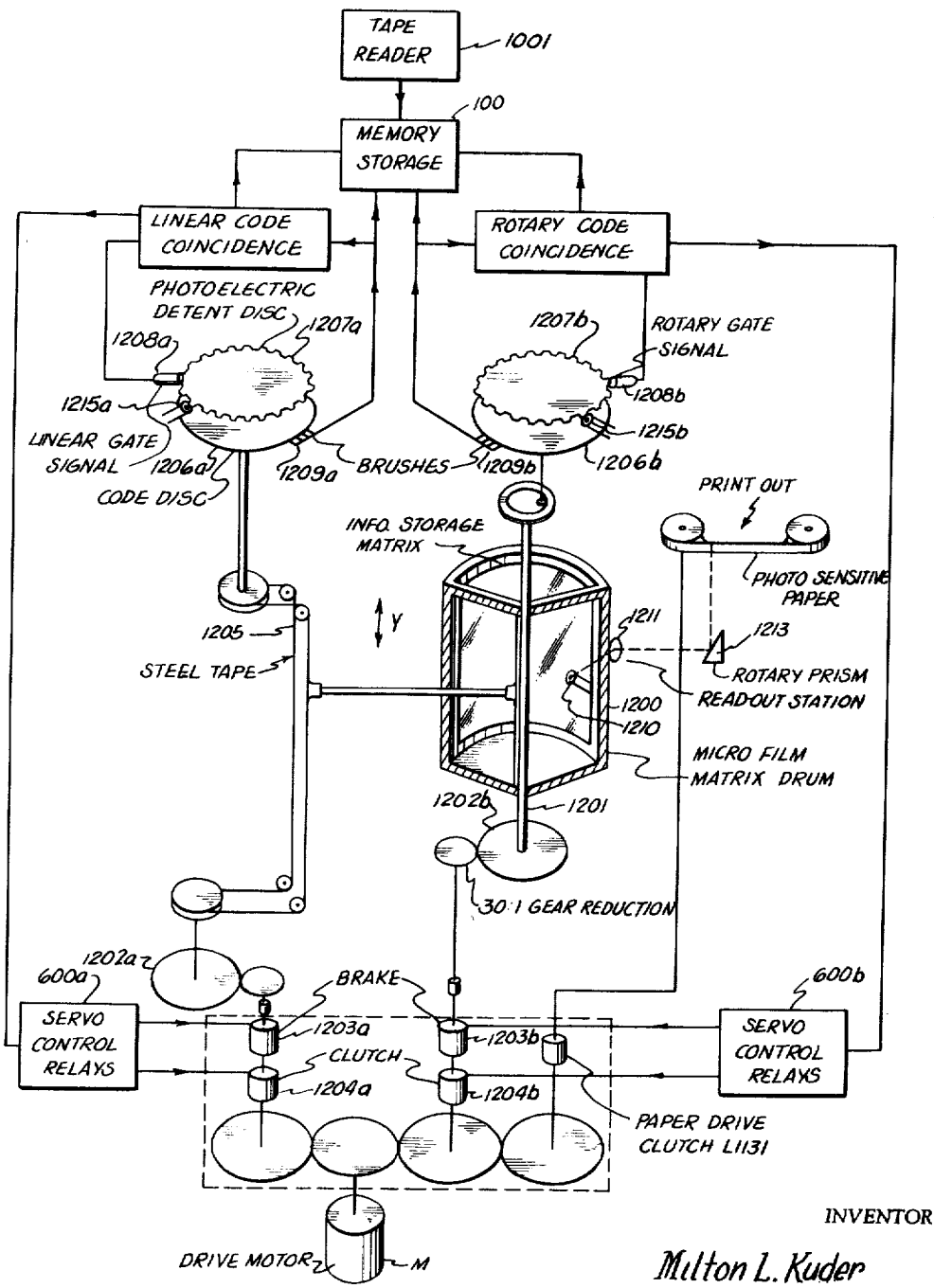
Fig. 12 is a mechanical schematic illustrating the servo-controlled search or drive mechanism for positioning the storage matrix.
Figure 12A:
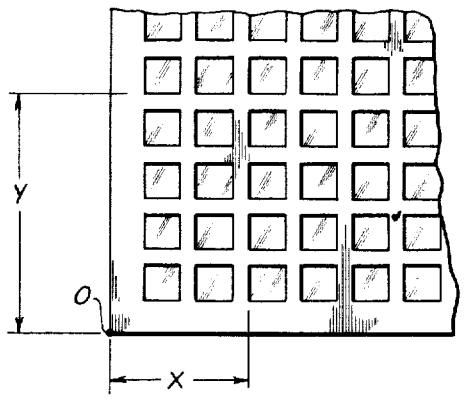
Fig. 12A is a detailed view of a portion of the information storage matrix.

The information-storage matrix is preferably supported on a drum 1200 as shown in Fig. 12 and is accurately located thereon by means of dowel pins. The drum is servocontrolled in both a linear or Y-coordinate direction and a rotary or X-coordinate direction of motion, corresponding to the Y and X coordinate axes of the matrix. The servomechanisms which control translation of the matrix to a selected coordinate position are mechanically coupled by means of precision gearing to two code discs 1206a, 1206b.

The code discs, one associated with each direction of motion of the drum are provided with means for identifying the coordinate positions of each store area on the storage matrix. The construction of a typical code disc is shown in Fig. 8A. The code discs may be photoetched or otherwise delineated with, for example, 100 conducting contact representations 1206c of 10-bit numbers corresponding to the standard teletype code employed. The two particular positions on the code discs, corresponding to the X and Y coordinates of the desired information frame are selected by means of a serial mechanical search. Specifically, the code discs are sensed by means of brushes 1209a, 1209b until a code combination is found that matches the binary representation recorded in the instruction-signal storing register. When compatibility is determined in this manner, magnetic clutches 1204a, 1204b, and brakes 1203a, 1203b, forming part of a mechanical-drum-positioning system are activated to provide rapid stopping of the drum. A read-out system in the form of a conventional automatic photographic printer is then energized and the selected frame is automatically reproduced in enlarged form on a strip of photosensitized paper. Upon completion of a print-out, or exposure, the teletype programming tape is advanced to provide the next frame position instruction, the drum is restored to a zero or datum position and the machine proceeds with a new search cycle as dictated by the programming means.

The read-out mechanism, as shown in Fig. 12, includes a light source 1210, a lens 1211, and a movable prism or mirror 1213, which may be indexed step-by-step across the width of the photosensitized print-out strip. In this manner a number, for example 15, of successive frames may be printed out in a row across the width of the photosensitized paper. The prism 1213 is indexed step-by-step across the width of the paper in typewriter fashion, automatically advancing the image one space on the photosensitized paper for each print-out. Upon completion of a line of print-outs, a line-feed servo 1000 (Fig. 10A) is provided to advance the read-out paper a fixed amount. The mechanical elements for indexing the prism and for line-feeding the sensitive paper are conventional and are not illustrated. The electrical control mechanism for these indexing mechanisms will be described in connection with Fig. 11. The referred-to special carriage-return and line-feed symbols of the teletype code illustrated in Fig. 10A to be described provide for returning the read-out prism to a zero position and to advance the read-out paper one line.

*Preliminary description Figs. 10 and 12*

As indicated in the simplified block diagram of Fig. 10A the storage microfilm matrix comprises a sheet of microfilm approximately 11 inches square. Ten thousand miniature frames of information are arranged on the microfilm matrix in a rectilinear array (see Fig. 12A) so that the location of each frame may be defined by an X and Y coordinate position. The elements for translating the matrix in X- and Y-coordinate directions are symbolically indicated in Fig. 10A. A mechanical schematic of such elements is presented in Fig. 12. While any desired configuration of geometrical coordinates may be employed to define the position of each information frame or store area, preferably, the store areas are rectilinearly arrayed in rows and columns corresponding to the X and Y dimensions of the storage matrix as detailed in Fig. 12A. The spatial location of each store area can therefore be readily defined in terms of the X- and Y-coordinate distances of the frame or store area from a common origin point O on the matrix. The matrix is accurately positioned on the drum 1200, Fig. 12, so that the abscissas or X direction of the matrix corresponds to the rotative movement of the drum, and the ordinate or Y dimension of the matrix corresponds to the linear displacement of the drum in the direction of its axis 1201. At the beginning of any search cycle, the drum generally returns to a datum position with respect to the read-out station 1211, such datum position corresponding to a position slightly below the referred-to point of origin O on the matrix. The search mechanism displaces the drum rotatively and linearly to the datum position represented by the lens 1211 corresponding to the X and Y dimensions of the matrix. If, during such directions of displacement, a store area is found corresponding to an instructional signal, the drum is stopped with the selected store area registered in congruence with the read-out lens 1211. A photographic print-out is then initiated and a cycle of operation is completed. A new cycle is thereafter initiated and the search mechanism is first activated in reverse rotative and linear directions so that the drum is restored toward the zero or datum position following which a new search cycle is initiated. If a store area of the type dictated by the programmed instructional signals should not be found during the forward or search movement of the drum, the displacement of the drum continues for distances corresponding to the extent of the referred-to X and Y dimensions of the storage matrix. Limit-stop switches, to be described, then inactivate the search mechanism.

It will be clear that the drum is reciprocatively driven in X and Y directions of displacement so that the entire area of the storage matrix may be swept out at the reading station. The drum is displaced in such coordinate directions by a servocontrolled mechanical drive system. The servomechanism is instantaneously controlled by a high-speed digital-type electronic circuitry which translates store-area locating, and store-area identifying signals into control signals affecting the servomechanism.

As shown in Fig. 12, the storage matrix is accurately positioned on the surface of a drum segment 1200 by means of suitable locating pins, not shown. The drum is rotatably and axially displaceable relative to the fixed read-out station represented by lens 1211 as indicated in Fig. 12. Oscillation of the drum in an X-coordinate direction is obtained by means of a shaft 1201 and gear train 1202b connected through a forward-reverse drive clutch 1204b to a drive motor M. A solenoid-operated brake 1203b is included in the gear train and operates jointly with the clutch. The drive motor M is also adapted to reciprocatively displace the drum along the longitudinal axis 1201 of the drum by means of a second forward-reverse drive clutch 1204a and brake mechanism 1203a, a gear train 1202a, and a drive belt 1205. The drive belt is secured by means of a suitable linkage to the drum, the drum being slidably mounted on the shaft 1201 in a longitudinal direction by means of suitable guides or rollers which are not indicated in detail. Y and X store-area position-identifying code discs 1206a and 1206b are connected to the corresponding X- and Y-drive mechanisms and are articulated therewith. The code discs comprise surfaces which are etched or otherwise delineated with binary code representations as is more clearly shown in Fig. 8A to be described. Each code disc is further connected to a sprocket-pulse or detent disc 1207a, 1207b. The sprocket discs as will be described in greater detail, are provided with precisely spaced markings which cooperate with a light source 1215a, 1215b and photocell arrangement 1208a, 1208b to generate timing or sprocket pulses which will also be referred to as PE synchronizing pulses. As shown in Fig. 8A, for a 10,000 store-area storage matrix, each of the coordinate identification code discs are provided with 100 serially arrayed identification numbers each number being represented by a radial line of contacts. One hundred of these radially-arrayed contacts are provided on each disc. Each number, as is conventional, is delineated in coded form as a pattern of contacts according to binary notation; a ground representing a binary 1.; and an insulated segment for a binary 0. The sprocket pulse disc such as 1207a is provided with a like number (100) of transparent markings 1207c, each corresponding to the radial lines of contacts on the code discs.

As shown in greater detail in conection with Fig. 8A, ten sensing brushes 1209a, 1209b (see Fig. 12) are provided adjacent each code disc and are adapted to serially sense the radial rows of binary code contacts on each code disc as they are rotated. The information signals sensed by each of the brushes are applied to a memory storage unit 100. A conventional teletype tape reader 1001 as shown in Fig. 12 senses the programmed code corresponding to the store area locating instructions and applies such information as a second input to a memory storage register 100. The information provided on each of the code discs 1206b and 1206a, respectively, corresponds to the actual coordinate position of each frame of information on the storage matrix associated with the code disc and the information fed into the memory storage 100 from the code discs therefore represents the instantaneous current position of any particular frame on the matrix. When the information stored in the memory storage 100 by the tape reader coincides with the code disc frame-identification information, it will be apparent that the desired frame of information on the storage matrix has been located. Coincidence control signals corresponding to the X- and Y-coordinate positions are then instantaneously transmitted to respective servo-control relay mechanisms 600a, 600b, respectively, as shown in Fig. 12, each of which functions to control the operation of a respective magnetic clutch 1204a, 1204b, and a solenoid-operated brake 1203a, 1203b to stop further movement of the drum. A lamp 1210 in the interior of the drum is then automatically energized to project the image of the selected frame through an optical system including the indexable prism or mirror 1213 which projects the enlarged image onto a strip of photosensitive paper. Means then are provided as will be described in greater detail, to clear the memory storage of the stored information and to automatically reset the drum to a near zero or datum position prior to initiation of a new search cycle. As will be further made apparent, a special mechanism is employed to obviate the need for returning the drum completely back to said datum position in situations in which the information frame sought in a subsequent search cycle is of lower denomination identity order than the preceding frame. The mechanisms which cooperate to achieve the positioning of the storage matrix in the manner described in connection with Fig. 12, can now be summarized by again referring to the simplified block diagram of Fig. 10A.

Figure 10B:
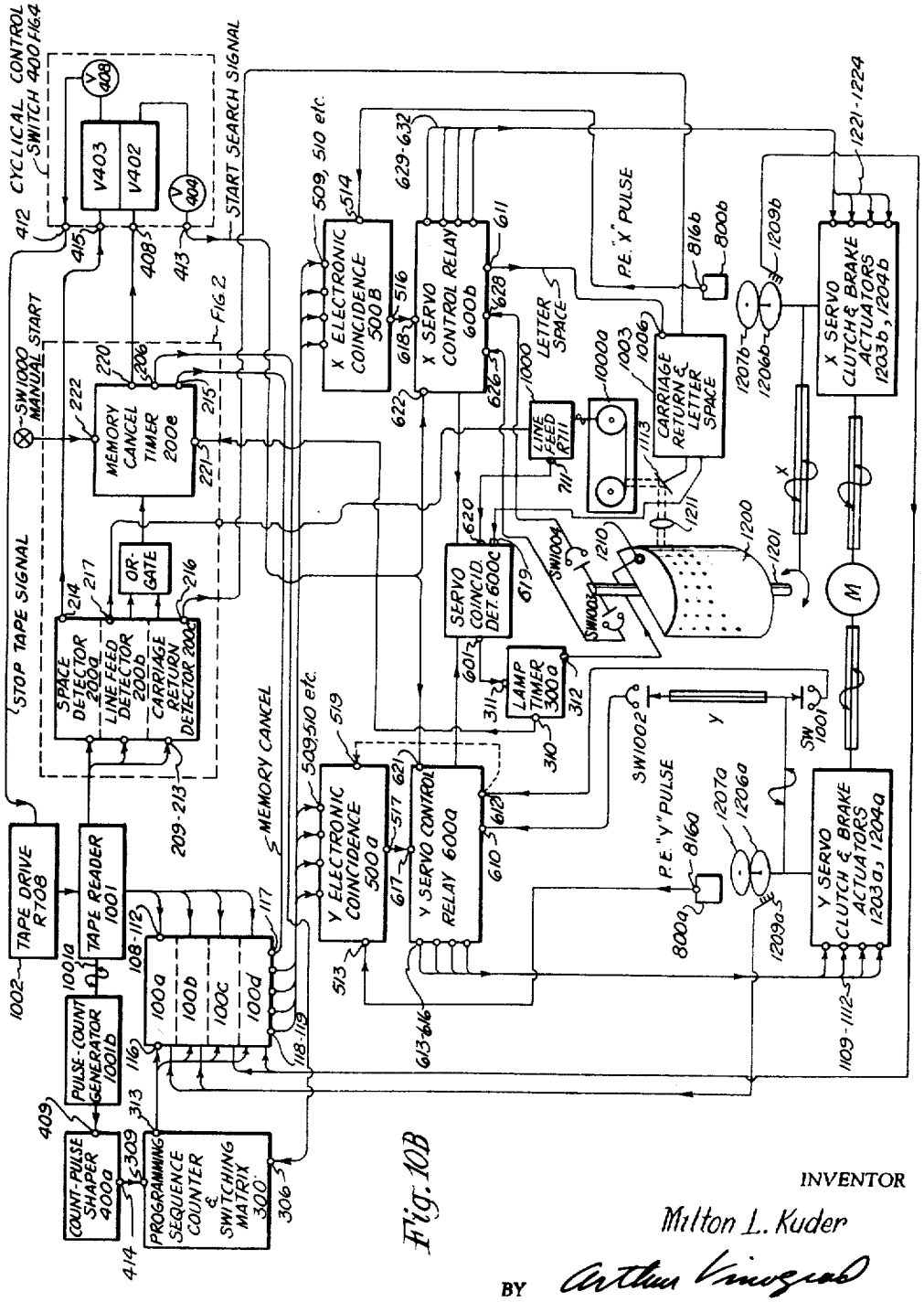

In Fig. 10A the rotary and axial movements of the drum are symbolically indicated by the displacement of the storage matrix in an X and Y direction, respectively. The X direction of movement is symbolized by an X servomechanism 600b for purposes of explanation and the Y direction of movement is similarly represented by a Y servomechanism 600a. In the actual combination, as will be described, displacement of the matrix is produced by a continuously rotating motor, the servos being employed to actuate a clutch and brake arrangement for selectively connecting and disconnecting the matrix drive mechanism and the motor. The X and Y servomechanisms also drive the X and Y code discs 1206a, 1206b in synchronism with the X and Y movements of the storage matrix as indicated in the block diagram. The information obtained by the tape reader 1001 is stored in a storage or memory device 100 and such information cojointly operating with the information provided by the code discs as is symbolically portrayed in Fig. 10A controls the X and Y servomechanisms to position the storage matrix. Over-all operation of the mechanism is governed by a programming control mechanism 300 which, as shown in Fig. 10A, determines energization of the X and Y servo storage matrix positioning mechanisms relative to the read-out device represented by lens 1211. The programming control 300 also determines initiation of the memory register 100 and through a tape servomechanism 1002 controls operation of the tape reader. Fig. 10A also shows the manner in which the referred-to special symbol information provided on the tape, controls operation of various other mechanisms. Specifically, when a space code is read from the tape a space detector 200a is energized. The space detector is connected to the programming control mechanism 300 to initiate a search cycle. Another of the special symbols employed is the carriage-return signal which energizes a carriage-return detector mechanism 200b. The carriage-return detector mechanism 200b, upon receipt of such signal, actuates the prism servo to restore the prism or mirror to an initial position with respect to an edge of the photosensitive paper in a manner analogous to the carriage-return in a typewriter operation. Similarly another of the special symbols is a line-feed signal which energizes a line-feed detector 200c. Such detector controls the operation of a line-feed servo 1000 which provides for line-feeding of the photosensitive read-out paper for a new line in a manner analogous to a typewriter. Fig. 10A is a simplified block diagram illustrating the over-all principles of operation. A more complete, detailed block diagram showing the cooperative arrangement of the elements comprising the present invention is shown in Fig. 10B.

Fig. 10B shows the essential elements involved in the mechanism of the present invention arranged according to the manner in which they cooperate to provide the stated objectives. The machine may be operated manually, through a single search cycle by energization of start switch SW1000 or may be cyclically controlled in an automatic manner under control of a cyclical control switching mechanism 400. The first numeral of the hundreds order designations of the blocks and elements in Figs. 10A and 10B in general identifies the figure number in which the detailed construction of such element is illustrated.

The manual start switch SW1000 is connected to a memory cancel timer 200e to be described in greater detail in conection with Fig. 2. Briefly, the memory cancel timer functions in part to apply a start-tape signal to a cyclical control switch 400 presently to be described. The application of such start-tape signal to the cyclical control switch 400 results in the following sequence of operation: (1) the tape-reader drive mechanism 1002 is initiated and after the store-area locating instructional signals have been read and stored, (2) the space signal on the program tape, through space detector 200a functions to stop the tape reader and concurrently energize the search mechanism.

The memory cancel timer 200e is also adapted to be automatically operated to produce the same start-tape control signal when initiated by a print timer 300a shown in Fig. 10B. As will be described in greater detail, completion of a photographic print-out operation results in the generation of a signal from the print timer 300a which is applied to the memory cancel timer 200e thereby automatically causing the latter to generate a start-tape signal for actuating the cyclical control switch 400 in the same maner as is obtained by actuating the switch SW1000.

The teletype tape reader mechanism 1001, Fig. 10B, includes an auxiliary shaft 1001a which is operatively connected to the drive shaft forming part of the tape reader mechanism. The drive shaft in the tape reader operates the sensing contacts of the teletype tape reader 1001 which are periodically engaged with the tape perforations as each line of coded perforating is read. The shaft 1001a is connected to a count pulse generator and shaper 400a symbolically illustrated in Fig. 10B. The count pulse generator 400a comprises the circuit including tube V407 in Fig. 4. In this manner, pulses are generated in sequence as each line of instructional signals is read by the tape reader and such pulses are applied to the programming counter 300 in order to sequentially regulate the energization of the memory storage register 100 as will be described.

*Cycle control switch 400, Fig. 4*

The referred-to start-tape signal is applied to "start tape" input terminal 408 of the cyclical control switch 400 shown in Fig. 4. Referring to Fig. 4, the application of the start-tape signal to terminal 408 results in triggering of tube V402 of a conventional bistable circuit comprising tubes V402 and V403. A tape advance buffer tube V408 is thereby rendered conducting establishing a conducting path between ground, tube V408 "tape advance" output terminal 412, terminal 708 in Fig. 7, through a tape-drive relay R708 and to the +300-volt source designated in Fig. 7. The tape-drive relay R708 forms part of the teletype tape reader drive mechanism 1002 (Fig. 10B) and feeding of the programming tape through the tape reader 1001 is thereby initiated. Since the teletype mechanism employed is a standard commercial item, no specific illustration of the tape reader mechanism is considered necessary. As is well known, such tape reader mechanism, feeds a perforated tape step-by-step so that each row of coded perforations is sensed in turn.

Figure 1:
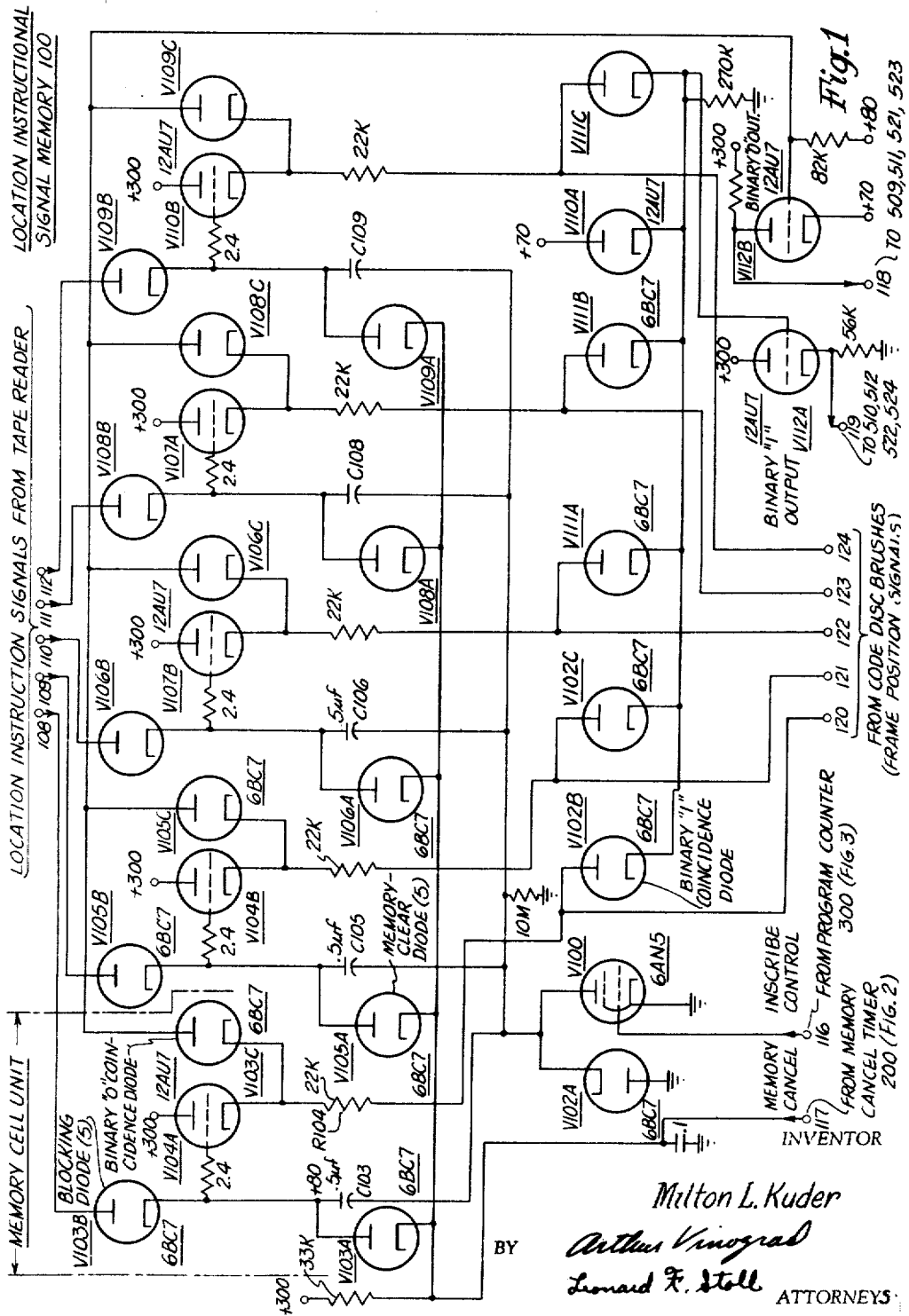

The tape reader 1001 (Fig. 10B) reads the coded information in the tape line-by-line and the sensed coded information is applied in parallel, as indicated in Fig. 10B, to a memory storage register comprising four memory register sections 100a, 100b, 100c, and 100d, as well as to a plurality of special symbol detectors, space detector 200a, line-feed detector 200b, and carriage-return detector 200c. It will be recalled that the instructional signals on the perforated tape consists of a 20-digit word preceded by one or more special symbols. The 20-digit word is a store-area locating instruction signal and includes 10 digits to identify the Y coordinate, and 10 digits to identify the X coordinate of the store-area position. Since the standard teletype code as indicated in Fig. 10A is made up of 5-order digits, four memory sections are employed. As indicated in Fig. 10B, two sections 100a, 100b of the register correspond to the Y coordinate and two sections 100c, 100d correspond to the X coordinate of a store area. Thus, in sequence, 5 digits of the 20-digit word are applied to the Y memory section 100a, 5 digits to the Y memory section 100b, 5 digits to the X memory section 100c and 5 digits to the X memory section 100d. The means for applying each 5-digit group of the coded instruction to the respective memory register sections in such sequence will be described in connection with the detailed description of the memory units (Fig. 1). Briefly, as previously indicated, the programming sequence counter 300 controls such sequential application of the signals to the memory register. The reading of the 20-digit word continues step-by-step until a space code special symbol is sensed by the tape reader.

Sensing of a space code special symbol, energizes the space code detector 200a which results in the application of a "stop-control" signal to the "stop-tape" input terminal 415 of the cycle control switch 400 as shown in Fig. 10B. Returning to Fig. 4 in which the cyclical control switch 400 is detailed, it will be seen that such stop-tape signal applied through terminal 415 restores the bistable circuit V402, V403 by energizing tube V403, thereby cutting off the tape-advance buffer tube V408 which had previously been rendered conducting by the start-tape signal applied on terminal 408, and deenergizing the tape-drive relay R708 (Fig. 7) of the tape-drive mechanism 1002 as is also clearly indicated in Fig. 10B.

It will be noted in Fig. 4, that the output of tube V402 is also coupled through a capacitor C401 to the input of a brake lock-up buffer tube V404. The output from tube V404 comprises a start search control signal manifested at terminal 413. Start search terminal 413 is connected through terminal 621 and 622, Fig. 6 to the brake lock-up contacts of a Y-brake relay R602 and X-brake relay R603 shown in Fig. 6 forming part of a control relay complex to be described.

As will be described in greater detail, the energization circuits for both the relays R602 and R603 include terminals 621, 622, 413, and brake lock-up tube V404. The tube V404 is cut off for a derivative time period defined by C401 and R409 (Fig. 4) and the resulting deenergization of terminals 621 and 622 drops out the two brake relays R602, R603. Such action results in energization of the search mechanism in a manner to be fully described as the description proceeds.

From the above portion of the description, it will be clear that a tape reading operation is initiated through memory cancel timer 200e by cycle control switch 400 to read-out a 20-digit store-area locating instructional word and then is terminated upon the sensing of a space code special symbol. The 20-digit frame locating instruction is stored in the four referred-to sections 100a, 100b, 100c, and 100d of the memory register in the manner now to be described.

The previously referred-to count-pulse generator 1001b (Fig. 10B) which is actuated by shaft 1001a as the tape reader 1001 cycles provides pulses through a conventional pulse generating mechanism (not shown) to input terminal 409 of a count-pulse shaper 400b. The circuit of the count-pulse shaper is also included in Fig. 4. Specifically, tubes V406A and V407 comprise a shaping circuit and the pulses so generated are applied through output terminal 414 (also shown in Fig. 10B) to an input terminal 309 of the previously-identified programming sequence counter and switching matrix 300. The circuit construction of the programming counter 300 is detailed in Fig. 3 and will be described in a subsequent portion of the specification.

*Memory storage 100, Fig. 1*

As further indicated in Fig. 10B, the 20-digit store-area locating instructional signals are applied concurrently to each of the memory sections 100a, 100b, 100c, and 100d. However, the circuit arrangement is such, as previously indicated, that each section will accept only 5 digits of the word in order of occurrence and each section will respond sequentially to each respective 5-digit group. Specifically, each memory section 100a–100d is sequentially energized by the programming sequence counter and switching matrix 300 to be described in connection with Fig. 3. Each section 100a–100d of the memory registers is identical in construction and comprises a circuit of the type illustrated in Fig. 1.

As shown in Fig. 1, each memory register section includes 5 memory cells in the form of respective storage capacitors C103, C105, C106, C108 and C109 corresponding to 5-digit increments of the instruction word to which each of the memory sections are respectively responsive. The 5-digit signals from the tape reader are applied in parallel through input terminals 108, 109, 110, 111, and 112 to respective blocking diodes V103B, V105B, V106B, V108B, and V109B. The purpose of each blocking diode is to prevent reverse discharge of the storage cells C103 etc., when charged. When the opposite ends of the memory cells C103 etc., are properly terminated as will be described, the signals presented to terminals 108–112 will charge the memory cells through the blocking diodes to a potential of approximately +180 volts. As previously indicated, however, each memory unit 100a etc. must first be energized in sequence. Energization of each memory section is controlled by a memory inscribe control tube V100 provided in each memory register section.

The grid of the memory inscribe control tube V100 is connected through input terminal 116 in Fig. 1 to an output terminal 313 of the programming sequence counter and switching matrix the circuit of which is detailed in Fig. 3. The specific construction of the programming counter will be described in connection with Fig. 3. Briefly, for the present, it should be noted that the programming counter 300 under the further control of the previously referred-to cyclical control switch 400 and pulse-count generator 1001b functions to ground the control grid of the control tube V100 in each memory register section 100a, 100b, 100c, and 100d in sequence. When the control tube V100 is rendered conducting in such manner, a common ground point is established for each of the memory cells C103 etc., each of which is tied to the plate of V100. Assuming for the moment that the sequencing control mechanism 300 (Fig. 10B) has rendered the first Y memory section 100a control tube V100 conducting, then the code signals from the tape reader applied at terminals 108–112 in Fig. 1 will charge respective ones of the memory cells C103 etc., corresponding to the applied pattern of code signals. In actual practice the memory cells are charged to a voltage level of approximately 180 volts. In this manner it will be clear that as each 5-digit coded representation on the teletype tape is read, each of the memory register sections 100a–100d will be energized in turn to store a 5-digit code pattern until the 20-digit instructional word has been read.

As has been outlined in connection with the brief description of the apparatus, compatibility between the store-area locating instructional signals stored in the memory sections and the store-area position identification signals obtained from the code discs 1206a, 1206b defines the rectilinear coordinate location of the desired information on the information-storage matrix. Such compatibility is determined by coincidence means provided in each of the memory sections as shown in Fig. 1.

*Memory storage coincidence circuit, Fig. 1*

Referring briefly to Fig. 8A, the code disc such as 1206a referred to in connection with Fig. 12 is indicated in relation to the sensing brushes 1209a. The X code disc 1200b and sensing brush 1209b are identical in construction. There are ten brushes associated with each code disc (one brush in each group shown in Fig. 8A being a ground) and these brushes are in turn connected to terminals 120, 121, 122, 123, and 124 of the memory register shown in Fig. 1. The action of the brushes in relation to the contacts 1206c on the code discs is to either ground or not ground terminals 120–124. That is, whenever a binary-one digit is sensed on the code disc by a brush, the corresponding terminal 120 etc. is grounded. A grounded contact corresponds to a "1" in a binary system of notation employed and an ungrounded terminal to a binary "0". At this point it can be noted that a charged memory cell C103 etc., is indicative of a stored binary "1" while an uncharged cell corresponds to a "0".

Each memory cell circuit in Fig. 1 includes an associated cathode follower V104A, V104B, V107B, V107A, and V110B. When a particular memory cell such as C103 etc., is charged to a +150-volt potential to indicate a "1" store, the corresponding cathode follower such as V104A will have a like voltage impressed on its cathode circuit R104. In such instance, if the brush (1209a, Fig. 8A) connected to the corresponding input terminal 120–124 in Fig. 1 is at ground potential, indicating the sensing of a "1" on the code disc, a condition of coincidence between the stored information signal and the drum position signal from the code disc will obtain. A respective binary "1" coincidence diode V102B, V102C, V111A, V111B, and V111C for each memory cell is connected to each of the cathode followers as indicated in Fig. 1 and the cathodes of the binary "1" coincidence diodes are tied in common to the grid of a binary "1" cathode follower output tube V112A. It will be clear from Fig. 1, that the anode of any binary "1" coincidence diode V102B etc., connected to terminal 120–124 which is at ground potential, will block the passage of a positive signal from the cathode followers V104A etc., to the grid of binary "1" output tube V112A. Such condition is true of all memory cell circuits having a charge compatible with the representation on the code discs. In other words, whenever the charge in any memory cell is compatible with the signal sensed by the code disc brush no signal will be applied to the grid of coincidence cathode follower V112A.

At this point in the description, it may be stated that the search mechanism for positioning the storage matrix is designed to operate according to the following pattern of generated control signals:

If the voltage generated by the binary "1" output cathode follower V112A and applied to output terminal 119 is less than 100 volts, it signifies "accept" (compatibility) requiring the storage matrix positioning apparatus or search mechanism to stop; if such voltage is greater than 100 volts it signifies "reject" (no compatibility) requiring the storage matrix positioning apparatus to continue searching. Similarly, a voltage obtained from the binary "0" output tube V112B and applied to terminal 118 which is less than 100 volts in amplitude corresponds to an "accept" and if such voltage is greater than 100 volts it corresponds to a "reject."

It will be clear then, from the above description, that when a condition of coincidence or compatibility exists between a particular memory cell circuit and code disc, there will be 70 volts applied (from V110A) to the grid of the binary "1" output cathode follower V112A and the signal applied to terminal 119 will be obviously less than 100 volts. This is equivalent to an "accept," and the search mechanism may thereby be inactivated as will be described. In such vein, it will be apparent, that if the terminal 120–124 corresponding to a charged memory cell is not grounded, (indicating no coincidence), then the 150-volt signal from the memory cell as obtained from cathode follower V104A etc., will be transmitted through a corresponding binary "1" coincidence diode V102B etc., to the grid of the binary "1" output cathode follower V112A. The resulting signal applied to terminal 119 will then be greater than 100 volts (approximately 165 volts) corresponding to a "reject." As previously noted, such condition results in the continued operation of the search mechanism until a coincident condition is obtained or until the search mechanism completes a search-sweep. In other words, grounding of all brushes corresponding to a charged memory cell is required to obtain a coincident or "accept" condition on terminal 119. If any brush corresponding to a charged cell is not grounded, then the anode of the binary "1" coincidence diode V102B etc., which is not grounded, will drag all of the common connected cathodes of the coincidence diodes to +150 volts and result in an output signal at terminal 119 which is greater than 100 volts (i.e., "reject").

Each memory cell circuit is also provided with a respective binary "0" coincidence diode V103C, V105C, V108C, and V109C. The anodes of the binary "0" coincidence diodes are tied gether and connected to the grid of the previously referred-to binary "0" output tube V112B and to a +80-volt source as shown in Fig. 1. The cathode of each binary "0" coincidence diode V103C etc., is connected to the cathode of a corresponding one of the cathode followers V104A etc. The anode of each binary "0" coincidence diode will normally be at +70 volts, (cathode voltage of V112B). When the memory cell is charged to 150 volts as described, the cathode of the binary "0" coincidence diode will be at approximately 160 volts so that the binary "0" coincidence diode is ineffective during a condition of binary "1." However, when a memory cell is not charged (indicating binary "0"), the cathode of the binary "0" diode V103C etc., will be open or may conduct. For when a corresponding brush terminal 120–124 is at ground potential the grid of the binary "0" output tube V112B which is normally at +70 volts, will be pulled approximately to ground potential and V112B will be cut off. Under such conditions with respect to the binary "0" representations the output on terminal 118 will be high (at approximately 210 volts). As above stated, any signal on terminal 118 which is greater than 100 volts corresponds to a "reject" and causes the search mechanism to continue operating or searching as will be described. When binary "0" output tube V112B is conducting, its output as presented to terminal 118 will be less than 100 volts indicating an "accept" or search-stop functional control.

It is now possible to explore the control effects resulting from the described "accept-reject" manifestations obtained at terminals 118–119 in Fig. 1. Before doing so, the remainder of the circuitry shown in Fig. 1 which relates mainly to the means for clearing the memory will first be described.

*Memory clear mechanism, Fig. 1*

Each memory clear circuit is also provided with a respective memory-clear diode V103A, V105A, V106A, V108A, and V109A. Such diodes operate in a characteristic manner to provide a low impedance discharge path-to-ground for the memory cell capacitors C103 etc. Specifically, it will be noted in Fig. 1 that the cathodes of the memory-clear diodes V105A etc. are tied to a memory-cancel input terminal 117 (see also Fig. 10) while the anodes are connected respectively to one plate of the storage capacitor C103 etc. As will be explained, a "memory-clear" signal originates in memory-cancel timer 200, Fig. 11, at a predetermined time. Such signal biases the cathode of the memory-clear diodes to ground potential. The resulting conduction of the memory-clear diodes provides a conducting path for discharging the memory cell capacitors.

Returning now to the explanation of the referred-to control effects produced by the signal patterns which are made available at terminals 118, 119 in Fig. 1 by the operation of the memory circuits, it will be recalled that a signal of less than 100 volts on terminals 118 and 119 signifies "accept" while a signal of greater than 100 volts on these terminals indicates a "reject." Terminal 118 is connected to terminals 509, 511, and 521, 523 of an electronic coincidence circuit 500 shown in Fig. 10B and detailed in Fig. 5 while terminal 119 in Fig. 1 is connected to terminals 510, 512, and 522, 524 of the coincidence detector circuit shown in Fig. 5.

Referring for the moment to the block diagram of Fig. 10B, it will be seen that there are two such electronic coincidence detectors; a Y-position coincidence detector 500a and an X-position coincidence detector 500b. The "accept-reject" signals from the referred-to terminals 118 and 119 in Fig. 1 are applied to both the X- and Y- coincidence detectors which function to regulate the operation of the search mechanism in each coordinate direction as will be described. It will be recalled, that there are four memory register sections of the type shown in Fig. 1 and as is evident in Fig. 10B, the two Y-memory sections 100a, 100b will apply "accept-reject" control signals to the Y-electronic coincidence mechanism 500a while the two X-memory sections are connected to apply "accept-reject" output signals to the X-electronic coincidence mechanism 500b.

*Electronic coincidence detectors 500 (Fig. 5)*

The circuit for each of the electronic coincidence detectors 500a, 500b is detailed in Fig. 5 of the drawings. These detectors serve to energize corresponding X and Y servo selecting relay complexes 600a, 600b as indicated in the block diagram of Fig. 10B. The X coincidence detector circuit 500b is shown at the upper portion of Fig. 5 while the Y coincidence detector 500a is illustrated at the lower part of the figure. The "accept-reject" control signals from terminals 118, 119 in Fig. 1 of the X memory sections 100c, 100d are applied to terminals 509–512 of the X coincidence circuit 500b in Fig. 5, and the corresponding signals from terminals 118, 119 of the Y memory sections 100a, 100b are applied to terminals 521–524 of the Y coincidence circuit 500a.

Considering the construction and operation of the X-electronic coincidence detector 500b by way of example, terminals 509–512 may receive either an "accept" signal of less than 100 volts, or a "reject" signal of greater than 100 volts from terminal 118 of Fig. 1 depending upon compatibility as described. At this point in the description, it will be convenient to mention the purpose of the sprocket pulse discs 1207a, 1207b associated with each code disc as was briefly described in connection with Fig. 12. The sprocket or timing pulses photoelectrically derived from the sprocket discs regulate the time of application of the "accept-reject" control signals to the search mechanism. That is, the "accept-reject" control signals, when applied to the coincidence mechanism of Fig. 5 are not immediately effective to control the search mechanism until gated by a PE sprocket pulse derived from the sprocket discs. The purpose of such arrangement is to prevent the search mechanism from being responsive to ambiguous signals that might be picked up during a transition by the code-disc sensing brushes. Since the sprocket discs are precisely positioned relative to a respective code disc, in a manner such that the sprocket pulse markings correspond to the spatial positions of the radially arranged contacts on the code discs, it will be apparent that a frame position signal sensed on the code coincidentally with a sprocket pulse will readily be distinguished from a spuriously derived signal. Actually the sprocket disc is slightly displaced relative to a code disc by a predetermined interval for a purpose to be described.

To achieve this purpose, a PE X-gate circuit comprising tubes V505 and V506A is provided in the X-coincidence circuit 500b and a PE Y-gate circuit comprising tubes V507 and V506b is included in the Y-coincidence circuit 500a as shown in Fig. 5. The X and Y sprocket pulses from the corresponding sprocket discs 1207b, 1207a in Figs. 10B and 12 are applied to terminals 513 and 514, respectively in Fig. 5. The X sprocket pulse is applied through tube V506a comprising a photoelectric pulse gate to provide a first input to gating tube V505. The second input to gating tube 505 is obtained from an appropriate one of the "accept-reject" control pulses applied to terminals 509–512 in the case of the X-coincidence circuit. Such control signal is applied through respective diodes, V501A, V502A, and voltage discriminator V504A as a second input to the gating tube V505.

Upon compatibility between the sprocket pulse from the sprocket disc and the control pulse from the memory section 100 concerned, the gate will transmit a signal to an X-brake mechanism relay multivibrator comprising tube V508 in Fig. 5. In a similar manner the gate tube V507 in the Y-electronic coincidence circuit 500a will be operated to transmit a signal to the Y-brake mechanism relay multivibrator comprising tube V510. If the amplitude of any one of the "accept-reject" control signals applied to an appropriate one of the terminals 509–512 is greater than 100 volts (i.e., "reject"), the corresponding diode in tubes V501A, V502 will conduct. The threshold voltage on amplifier V504A is approximately 100 volts as indicated. When the aforementioned voltage from the diodes applied to the grid of V504A is greater than such 100-volt threshold, V504A will conduct, applying a negative signal to the grid of gating tube V505, blocking the tube. Since no output will consequently be obtained from the gating tube, there will be no control effect signal manifested on the X-brake mechanism relay multivibrator V508. The X-brake relay multivibrator V508 is connected through output terminal 516 (Fig. 5) to the X servo control relay complex 600b (see Fig. 10B) which, as will be described, ultimately functions to energize the solenoid (1203b, Fig. 11) which actuates the X-brake 1204b (Fig. 12). In the absence of an output from V508, the brake mechanism will be inactive so that the search mechanism will continue operating as will be described in greater detail. In other words, a control signal having an amplitude greater than 100 volts applied to any of the terminals 509–512 will inhibit the PE gate and keep the search mechanism running. It will be clear that the Y PE gate comprising tube V506B and associated relay multivibrator V510 shown in Fig. 5 functions in a like manner in response to the PE pulses obtained from sprocket disc 1207a.

Should all of the four input terminals 509–512 simultaneously receive a control signal having an amplitude less than 100 volts ("accept"), a condition which would be manifested only upon compatibility between the store-area locating instructional signals stored in memory register 100 and the store-area position identification signals obtained from the code discs such as 1206b, then tube V504A will be cut off and the resulting positive signal applied to one grid of the gating tube V505 coinciding with the PE sprocket pulse applied to the second grid, as described, will result in the application of a control effect signal to the X-brake mechanism relay multivibrator V508. The resulting control signal obtained at output terminal 517 will result in actuation of the brake mechanism in a manner to be described thereby stopping the search mechanism at a position such that the desired information frame on the information storage matrix will be adjacent the reading station represented by lens 1211 in Fig. 10B. The operation of the Y-electronic coincidence circuit 500a and related Y-brake mechanism relay multivibrator is identical to the X mechanism and will not be further described.

The means for obtaining the X and Y PE pulses are indicated in Figs. 10B and 8. A photocell is mounted adjacent each sprocket disc 1207a, 1207b as shown in Fig. 10B. Each sprocket disc as shown in 8A is provided with a series of peripherally arranged transparent "teeth" which permit light from a light source (not shown) to be focused on the photocell. Each photocell V800a, V800b as shown in Fig. 8 is included in a respective conventional amplifier circuit 800a, 800b comprising the tubes V801 and V802, respectively. The Y synchronizing pulse is thereby obtained at output terminal 816a and the X synchronizing pulse terminal 816b.

Each of the brake mechanism relay multivibrators such as the X-brake multivibrator V508 is a conventional one-shot multivibrator the output of which is connected through buffer tube V509A to output terminal 516. Similarly the Y-brake multivibrator is connected through buffer V509B to Y-brake relay terminal 517. Each of the one-shot multivibrators V508, V510 are employed as pulse stretchers for the purpose of maintaining the pulse duration of the pulse to insure energization of the brake control relay mechanism now to be described.

*Servocontrol relay complex*

The X-brake relay multivibrator output terminal 516 is connected to input terminal 618 in Fig. 6 and the Y-brake relay multivibrator output terminal 517 is connected to terminal 617 in Fig. 6. Referring briefly to the block diagram of Fig. 10B, which also shows such terminals, it will be seen that the brake relay control signals generated in each of the electronic coincidence detectors 500a, 500b described in connection with Fig. 5 are applied to corresponding Y and X servo selection relay complexes 600a and 600b. The servo selection relay complexes are also energized by signals from the previously described cyclical control switch 400 through terminals 621, 622. When the servo selection relay complexes 600a, 600b are energized in a manner to be described in detail, they provide signals for actuating clutch and brake solenoids to be described in connection with Fig. 11, and a servo finish coincidence circuit 600c. The clutch and brake solenoids as will be more apparent by referring to Figs. 11 and 12, function to respectively disconnect the drum displacing mechanism from the motor M and simultaneously apply the drum brakes which bring the information storage matrix carrying drum to an abrupt halt. The servofinish coincidence unit 600c actuates a print timer and lamp mechanism 300a which functions to automatically print out the selected information frame.

As has been previously described, the drum 1200 (Figs. 10B and 12) is displaced by the search mechanism from a predetermined near-zero or datum point in an X-direction represented by reciprocation of the drum about the axis 1201 and in a Y-direction corresponding to reciprocation of the drum longitudinally of such axis. That is, the drum is oscillated and reciprocated through respective distances corresponding to the X- and Y-dimensions of the information matrix unless, of course, compatibility between the instructional signal and the code discs cause the drum to stop at an intermediate position. The extent of the drum's oscillatory and reciprocative movements is determined by suitable limit switches. Specifically, referring to Fig. 10B and a Y search-start switch SW1001 and a Y limit-stop switch SW1002 are provided to define the extent of the Y displacement of the drum, while an X search-start switch SW1003 and an X limit-stop switch SW1004 determine the extent of oscillation of the drum in an X-direction. As is evident from Fig. 10B, both the Y stop-switch SW1001 and the Y limit-switch SW1002 are connected to the Y servomechanism relay mechanism 600a. Similarly the X stop and limit switches, SW1003, SW1004 are each connected to the X servo selection relay mechanism 600b.

The referred-to switch connections are operatively indicated in the servo relay diagram of Fig. 6. That is, the connection from the Y limit-stop switch SW1002 is applied to terminal 610 in Fig. 6, the connection from the Y search-start switch SW1001 is connected to terminal 612 in Fig. 6. Similarly, the X limit-stop switch SW1004 is connected to terminal 626, and the X search-start switch SW1003 is connected to terminal 628. The manner in which these stop and limit switches control the limits of displacement of the drum in an X- and Y-direction by suitably energizing the brake and clutch mechanism will be referred to in connection with the detailed description of Fig. 6.

As previously pointed out in connection with Fig. 12, the drum positioning mechanism schematically shown in such figure includes a reversible drive X clutch 1204b between the drive motor and the gearing 1202b which can be selectively activated to oscillate the matrix carrying drum in either direction about axis 1201 corresponding to an X coordinate of store-area location. Similarly a reversible drive Y clutch mechanism 1204a is provided between the motor and the linkage 1202a which can also be selectively activated to reciprocate the drum longitudinally of the axis 1201 corresponding to the Y coordinate location of a store-area. A corresponding X and Y brake 1203b, 1203a is provided in connection with each clutch and is articulated therewith to produce rapid stopping of the drum in each direction of movement. The clutch employed is a conventional magnetic clutch such as a Warner Type SF160 Electric Clutch manufactured by the Warner Electric Brake Clutch Company. Each clutch is provided with separate energizing coils as indicated in Fig. 11. Specifically, the Y clutch 1204a includes a clutch-forward drive coil L1204aS and a clutch-reverse drive coil L1204aR. The X clutch 1204b similarly comprises a forward drive and reverse drive coil L1204bS and L1204bR, respectively. The forward drive coil in each clutch when energized as will be described causes engagement of the drum drive mechanism in a forward or search direction, while the reverse-drive coil when energized results in engagement of the drum drive in a reverse or "back-to-zero" direction.

The connections between X and Y servocontrol relay complexes 600a, 600b and the respective clutch and brake solenoid terminal are clearly summarized in Fig. 10B. Specifically, output terminals 613–616 or the Y servo complex are connected respectively to input terminals 1109–1112 of the Y brake and clutch solenoids (Fig. 11) and output terminals 629–632 of the X servo complex are connected to input terminals 1121–1124, respectively of the X brake and clutch solenoids.

The brakes 1204a, 1204b are electromagnetic braking devices such as a Warner type RF160 electric brake.

As each clutch 1203a, 1203b is selectively energized to establish a drive connection between the motor M and the drum driving means, the brakes 1204a, 1204b are concurrently released and vice versa. The previously-described memory register and coincident circuits of Figs. 1 and 5 provide suitable control signals for energizing the clutch and brake mechanisms depending upon compatibility between the programmed frame locating instructional signals and the code disc frame position signals. Such control signals energize the brake and clutch circuits through the X and Y servo control relay complexes 600b and 600a as indicated in Figs. 10B and 12. The control relay circuits are detailed in Fig. 6, now to be described.

Fig. 6 shows the four relays comprising the control relay circuit complex 600a, 600b. The circuits include a Y-clutch relay R601, a Y-brake relay R602, an X-brake relay R603, and an X-clutch relay R604. Each of these relays are activated as will be described according to a pattern which provides proper energization of the clutch and brake operation coils detailed in Fig. 11.

The relay mechanism shown in Fig. 6 will be functionally described, since standard relays are employed and their construction and mode of operation as electric circuit elements are well known and readily apparent from the schematic drawing. At the beginning of any search cycle the drum will be stopped at a position corresponding to a particular located store area as a result of a previous search operation, so that the Y and X brake relays R602 and R604 will be energized to hold the drum in a locked position. Since the Y and X relays are identical in construction and mode of operation, the following detailed description will be applied to the Y clutch and brake relays, it being understood that the X brake and clutch relays R603 and R604 operate in an identical manner to control the displacement of the drum.

When the drum is stopped to provide a print-out in a previous cycle, the Y brake relay R602 will have accordingly been energized, the coil of the relay being held in an energized state by the brake hold circuit comprising the 300-volt source, brake lock-up contacts of Y brake relay R602, and Y search-start terminal 621. As previously described, terminal 621 is connected to the plates of brake lock-up buffer tube V404 of the cyclical control switch 400 shown in Fig. 4 through terminal 413 (see also Fig. 10B). The tube V404 is connected so that its grids are normally at ground potential, a condition in which it is primed for conduction upon the application of a positive potential to its plate. At the start of a cycle the Y-brake relay R602 will normally be energized by a previous deenergization of the Y clutch relay R601 (upon a compatibility determination from a previous cycle) and terminal 621 in the referred-to hold circuit for the coil of relay R602 will therefore be connected to ground through brake lock-up buffer tube V404. An energizing circuit for the Y-brake relay R602 is thereby established. It will be recalled that when the tape reader mechanism stops, the electronic switch comprising tube V402, V403 of cycle control switch 400 in Fig. 4 functions to transmit a negative pulse to the normally grounded grid of brake lock-up buffer tube V404 through a differentiating circuit comprising capacitor C401 and resistor R409. During such derivative time interval which is approximately 10 milliseconds, tube V404 is cut off, breaking the above hold circuit for brake relay R602 and causing the brake relay R602 to drop out. The brake relay remains so deenergized until triggered by a subsequently occurring recognition signal. After the 10 millisecond derivative time interval, the grid of the brake lock-up buffer tube V404 is again at ground, the tube remaining primed ready to provide a hold circuit for relay R602 when compatibility is again determined.

When the brake relay R602 is deenergized as above described, the brake clutch selector contacts of the relay establish a circuit as is apparent in Fig. 6 from a +100-volt source through the brake-clutch direction selector contact of the clutch relay R601 to the Y reverse clutch terminal 615. Terminal 615 is connected to terminal 1110 in Fig. 11 as is also indicated in Fig. 10B and accordingly the reverse-drive coil L1204aR (Fig. 11) of the Y clutch 1204a (Fig. 12) will be energized to cause restoration of the drum to a zero or initial position. Although the Y clutch relay R601 remains unenergized at this time, the energizing circuit established between the 100-volt source, the brake clutch selector contacts of R602 and the direction selector contacts of R601, acts to energize the reverse drive portion of the magnetic clutch 1204a. The drive motor M shown in Fig. 12 under such condition drives the drum in a reverse or drum restoring direction until the Y reverse limit search-start switch SW1001 shown in Fig. 10B is actuated. The switch SW1001 represents the near-zero datum point previously referred to. The Y reverse limit search-start switch SW1001 is connected to terminal 612 in Fig. 6 and its momentary closure provides a ground through the clutch unlock contacts of brake relay R602 through the coil of Y clutch relay R601 and to the plus 100-volt source indicated at terminal 604. The coil of the Y clutch relay R601 is accordingly energized and its clutch lock-up contacts provide a hold circuit for the clutch relay as is evident from Fig. 6. The hold circuit can be traced from the 100-volt source through the coil of relay R601, clutch unlock contacts of R602, and clutch lock-up contacts of R601 and ground.

Energization of the Y clutch relay R601 results in actuation of the direction selector contactor from the position shown in Fig. 6 to one in which it contacts its upper contact. Such action results in deenergization of the Y reverse clutch terminal 615 thereby deenergizing the corresponding Y reverse magnetic clutch coil L1204aR shown in Fig. 11. The actuation of the direction selector contactor results in energization of the Y search clutch terminal 614 which is connected to terminal 1112 in Fig. 11 and energizes the forward-drive coil L1204aS of the magnetic clutch 1204. Energization of the Y magnetic clutch 1204 in this manner causes the drive motor M shown in Fig. 12 to drive the Y direction translating mechanism of the drum in a forward or search direction starting from its previously-described initial position. Thus a search cycle of the drum is initiated and the drum will continue to be translated from an initial position until a condition of compatibility between the Y store-area locating instructional signal in the memory register and the Y store-area position identifying signals obtained from the code discs is attained. The X brake and clutch relays R603, R604 function in a similar manner to produce a like control effect on the X or rotary drive mechanism of the drum. Closing of the brake operation synchronizer contacts of clutch relay R601 readies an energizing circuit for the coil of brake relay R602 from the +300-volt source to terminal 617. However, terminal 617, which is connected to terminal 517 in Fig. 5 is ineffective to provide a conditioning path until an "accept" condition has been determined as a result of compatibility. At this point it may be noted that unless such condition of compatibility is sensed during the movement of the drum in a search direction, the drum will continue to move until the Y limit stop-switch SW1002 is actuated. Such switch provides a signal on terminal 610 which will result in energization of the Y-brake relay R602 and concurrent deenergization of the Y clutch relay R601. The search mechanism is thereby inactivated upon completion of a search displacement. If a condition of compatibility is found during movement of the drum in a search direction, a signal will have been obtained from terminal 517 of the electronic coincidence detector described in connection with Fig. 5 and applied to terminal 617 in the brake operation synchronizer circuit which has been readied by the closing of the clutch relay brake operation synchronizer contacts. Such signal applied to terminal 617 provides the same effect as a signal from the limit-stop switch SW1002; namely, it establishes an energizing circuit for the coil of the Y-brake relay R602 through the brake operation synchronizer contact of the Y clutch relay R601 which is closed when the Y clutch relay is energized, the coil of R602 and the plus 300-volt signal source indicated in Fig. 6. As soon as the Y brake relay R602 is energized the above-described control effects subsequent to energization of the Y-brake relay and the concurrent deenergization of the Y clutch relay R601 is produced.

Specifically, energization of the brake relay R602 establishes the first enumerated condition existent at the beginning of a cycle. Closure of the brake lock-up contacts of brake relay R602 establishes a hold circuit; opening of the clutch un-lock contacts deenergizes the clutch relay R601 resulting in a release of the Y clutch 1204a in Fig. 12, and actuation of the brake clutch selector contacts from the position indicated in Fig. 6 provides a signal from +100 volts through terminal 616, Fig. 6 into terminal 1111, Fig. 11 to energize the Y-brake solenoid L1203a. The brake 1203a in Fig. 12 is accordingly actuated to stop the drum in a Y coordinate position. Corresponding activation of the X-brake relay R603 results in energization of the X-brake solenoid L1203b, Fig. 11, to actuate the X-brake 1203b in Fig. 12. Since the clutches 1204a and 1204b have been disengaged, the drum is immediately stopped in the desired read-out position.

When both the Y and X-brake relays R602, R603 are energized as a result of a compatibility condition in this manner to produce stopping of the drum, the finish coincidence contacts of each such relay are closed establishing a common circuit between the Y and X relay control systems as indicated in Fig. 6. The establishment of such common circuit results in energization of the servofinish coincidence circuit 6001c comprising the tube V600 shown in Fig. 6. The circuit associated with tube V600 provides a time delay between the finish coincidence circuit including the finish coincidence contacts of relays R602, and R603, and the output terminal 601 which is connected through terminal 311 Fig. 3 to a lamp timer multivibrator circuit comprising tubes V308 the circuit of which is included in Fig. 3. The resulting triggering of the lamp timer circuit comprising the tube V308 and the energization of the lamp timer buffer V309a results in energization of output terminal 312 in Fig. 3 which is connected to terminal 712 in Fig. 7. As is apparent in Fig. 7, terminal 712 forms an energization source for the coil of a lamp relay R709. It will be noted from Fig. 6 that the finish coincidence contacts of the relays R602 and R603 are included in a circuit comprising the terminal 620 which is derived from terminal 711 in Fig. 7. Terminal 711 is connected through normally closed contacts of the line-feed relay R711 and the carriage-return relay R710 to a minus 300-volt source as shown in Fig. 7. It will thus be apparent that the carriage-return relay R710 and line-feed relay R711 are articulated in the referred-to servofinish coincidence circuit which is employed to actuate the lamp timer. In this manner, opening of the referred-to circuit included between line-feed relay R711 and carriage-return relay R710 insures that no print-out can occur when either a line-feed or carriage-return operation is taking place.

As previously-described, (see Figs. 8A and 10B) a photoelectric type of synchronizing pulse disc 1207a, 1207b is articulated with each code disc 1206a, 1206b, respectively. The synchronizing discs supply detent or sprocket pulses which regulate the search mechanism as previously described.

The information storage matrix carrying drum is translated at a relatively high speed in both a Y (linear) and X (rotary) direction. It is obvious that inertial effects would preclude instantaneous stopping of the drum at the exact position corresponding to the coordinate position of the desired information frame. The information storage frames or store areas, moreover, are so small that any degree of error in positioning of the drum could not be tolerated.

The necessary accuracy of drum positioning is attained in accordance with the principles of the present invention by deliberately permitting overtravel. The optimum amount of overtravel is first determined and is treated as a constant. Such constant overtravel value is then compensated by properly phasing the photoelectric light source and the brushes 1209a, 1209b relative to the detent discs 1207a, 1207b and the code discs 1206a, 1206b, respectively. Since, as has already been described, in connection with the mechanism of Fig. 5, the output of the coincidence mechanism 500 is conditioned by a triggering pulse from the detent disc, it will be apparent that the control ("accept") signal evolved upon determination of compatibility in the manner described will be manifested at a time corresponding to the fixed predetermined overtravel period sufficiently in advance of the resulting energization of the clutch and brake mechanisms, to stop movement of the drum at a position relative to the read-out station coinciding with the selected information frame.

It has been previously mentioned in connection with the description of Fig. 5 that the circuit comprising tube V511A in Fig. 5 provides a means for obtaining a control effect should a condition of compatibility be manifest when the drum is being displaced in a reverse or restorative direction. It will be recalled that the electronic coincidence detector circuit of Fig. 5 correlates the "accept-reject" control signals obtained from the memory storage register 100 with the PE synchronizing pulses to provide X and Y brake energizing control signals.

Should then, a condition of compatibility be sensed during a drum restorative displacement, then the resulting energization of tube V508 as previously described will, after a time delay defined by C504, R504 trigger the tube V511A and render it conducting for a derivative period defined by C509, R509. The plate of V511A is connected through output terminal 512a to input terminal 628 of the servo relay complex in Fig. 6. The resulting energization of terminal 628 performs the same control effect as the referred-to reverse limit search-start switch SW1003. That is, it immediately activates the search mechanism to displace the drum in a forward or search direction so that the desired frame or store-area is located without the necessity of the drum cycling back to its near-zero datum position. Such feature results in an obvious savings in cycle time. The possibility of the occurrence of a frame locating serial number is greater when the previous frame identification number is higher. That is, if the previous identification number on the X axis were 98, there would be a corresponding number of chances (in 100) that the next desired frame would be somewhere between 0 and 98.

The above-described feature thereby permits effective compatibility determination without the necessity of resetting the drum to its near-zero or datum position for each search cycle.

*Special symbol detectors, Fig. 4*

The purpose and function of the special symbol detectors have been generally referred to in connection with the description of Fig. 10B. The tape reader mechanism 1001 is connected in parallel as shown in Fig. 10B to each of the special symbol detectors; namely, space symbol detector 200a, line-feed symbol detector 200b, and carriage-return symbol detector 200c. The three enumerated special symbols provide instruction signals for performing the following control effects. Specifically, the space symbol functions to stop the tape reader after a store-area locating instructional word has been sensed and to initiate a search cycle; the line-feed and carriage-return symbols are employed to advance the photosensitive recording paper the equivalent of one line and to restore the prism to a position corresponding with one edge of the strip.

The special symbols calling for space, line-feed and carriage-return are included as codings on the teletype tape as symbolized at the top of Fig. 10A. The conventional teletype mechanism provides a special instructional coded symbol for word space, carriage-return and line-space as indicated at the top of Fig. 10A. Such symbols are accordingly employed to produce special control effects in connection with the operation of the mechanism of this invention. The special symbol code pulses are applied concurrently to each of the special symbol detectors 200a, 200b, and 200c as shown in Fig. 10B. Each of the special detectors, the circuits of which are detailed in Fig. 2 are provided with means for selecting only the particular unique instructional code corresponding to "space," "line-feed," and "carriage-return" pertinent to its special control operation.

Referring to Fig. 2, the space detector circuit 200a is shown as including tube V201 and V202; the line-feed detector 200b includes the tubes V203 and V204 while the carriage-return detector 200c comprises the circuit including tubes V206 and V205. Each of the special detectors responds only to its respective special symbol code, the code from the tape reader being applied concurrently to all of the detectors through common input terminals 209–213. The terminals 209–213 are connected to receive the signals from the tape reader mechanism 1001 as shown in Fig. 10B. Selective response of each detector to its respective code is accomplished through three summing-inhibitor circuits comprising the resistor groups R202–R205, R211–R214, and R223–R226, respectively. Since the input terminals 209–213 energized according to different patterns of pulses corresponding to each of the special coded symbols, as indicated by the typical perforated tape representation shown in Fig. 10A, the connections between the inhibitor resistor groups is such as is evident from Fig. 2, that the grid of only one of the tubes V201, V203, or V205 will be cut off. When the selected one of these tubes is rendered nonconducting in this manner, an associated gate tube, for example, gate tube V202 in the space detector 200a will be rendered conducting and only when a binary "1" is applied solely to terminal 211 (the space symbol code being 00100 in such instance) to apply a stop-tape signal to terminal 214. Terminal 214 is connected to terminal 415 of the previously-described cycle control switch mechanism of Fig. 4 (see also Fig. 10B) and acts through such mechanism to stop the tape drive and reader mechanism 1002, 1001 after a reading operation has been completed. It will be recalled that a special space symbol is provided following each group of storage matrix frame locating instructions and the above action of the space detector therefore provides the desired stopping of the tape reader after the locating instructions have been injected into the memory sections, by applying a stop-tape signal from terminal 412 to the tape drive mechanism 1002 as indicated in Fig. 10B. Initiation of the cycle control switch 400 in this manner also results in generation of the referred-to start-search signal which is applied through terminal 413 of the cyclical control switch to terminals 621 and 622 of the Y and X servocontrol relay complexes 600a, 600b (Fig. 6) to initiate the search mechanism in the manner previously described in connection with Fig. 6.

Should a line-feed operation be called for by a special line-feed symbol on the teletype tape, tube V203 of the line-feed detector 200b in Fig. 2 will be rendered conducting and its associate line-feed gate tube V204 will apply a line-feed control pulse to output terminal 217. Terminal 217 is connected to an input terminal 914 in Fig. 9 which leads to a line-feed univibrator circuit comprising tube V902. The line-feed univibrator provides a short delay and energizes output terminal 909, Fig. 9, through a buffer tube V904. Terminal 909 is connected in turn to terminal 715 of the coil of a line-feed relay R711, Fig. 7 (indicated as 1000 in Fig. 10B). Such relay when energized by the line-feed control signal functions to actuate a conventional paper-feed mechanism.

It will be noted from Fig. 2, that the line-feed control signal obtained from line-feed detector gate V204 is also applied to an or-gate comprising tube V207. The or-gate is connected to a memory cancel timer circuit 200e comprising tube V209 in Fig. 2. The memory cancel timer 200e is also separately identified in Fig. 10B. The output of the carriage-return detector 200c to be described is also connected to such or-gate. After either a line-feed or carriage-return signal has been detected, either of such signals functions through or-gate V207 to cause the memory cancel timer 200e to generate a memory cancel pulse which is used to clear the memory registers. Such cancel pulse is applied through output terminal 215, Fig. 2, to terminal 117, Fig. 1, and initiates the memory clear operation described in connection with the description of Fig. 1.

The manifestation of a carriage-return instruction symbol on the teletype tape produces energization of tube V205 of the carriage-return detector 200c. The carriage-return gate tube V206 then provides a control signal through terminal 216 to terminal 916 in Fig. 9 which is connected to a carriage-return univibrator V903. The carriage-return univibrator provides a control signal through buffer tube V904 which is connected through terminals 910, 716, Fig. 7, to the coil of carriage-return relay R710 forming part of the carriage-return or prism reset mechanism 1003 as shown in Fig. 10B. The resulting energization of relay R710 functions through terminal 710 to actuate the prism reset mechanism 1003 diagrammatically indicated in Fig. 10B. The prism reset mechanism 1003 restores the prism 1113 to an initial position corresponding to the beginning of a line at one edge of the photosensitized paper.

It will be noted from Fig. 7 that terminal 717 of the carriage-return relay R710 is deenergized consequent to energization of relay R710. Terminal 717 is connected to terminal 619 of the servo relay complex detailed in Fig. 6. When the carriage-return relay R710 is thus deenergized, a +100-volt potential circuit normally exists between the +100-volt source in Fig. 7, terminal 717, terminal 619, Fig. 6, and the brake clutch selector contacts of the X brake-relay R603. Such +100-volt source provides the power for operating the X reverse and the X search-clutch coils L1204bR and L1204bS as was previously described. However, when the carriage-return relay R710 has been energized by a carriage-return instruction signal, the power source for the X search and reverse coils m of the X clutch 1203b is disconnected and operation of the search mechanism cannot be effected during a carriage-return operation. Completion of a carriage-return operation is thereby insured.

It will be apparent from a consideration of the block diagram of Fig. 10B that since the special symbols read from the tape are the same, except for code significance, as the frame locating instructional signals, such symbols will also be registered in the memory unit sections which are connected in parallel with the special symbol detectors to the tape reader. Since the memory cancel timer in Fig. 2 is initiated by the special symbol detectors 200b and 200c, however, clearing of the memory sections by the memory cancel timer will also clear the memory sections of any special symbols registered therein.

The memory cancel timer 200e also provides the previously identified "start tape" output signal at output terminal 220 in Fig. 2. Such signal as is apparent from Fig. 10B is applied to input terminal 408 of the cyclical control switch mechanism of Fig. 4 and results in the subsequent initiation of a tape read operation as has been fully described in connection with Fig. 4.

The memory cancel timer 200e additionally provides a "counter reset" signal which is applied through output terminal 206, Fig. 2 to terminal 306, Fig. 3, to reset the programming sequencing counter for a new cycle of operation. The above connections can readily be followed by reference to Fig. 10B.

It will also be noted from Figs. 2 and 10B that input terminal 222 of the memory cancel timer is connected to the manual start switch SW1000 which, as described in connection with Fig. 10B, manually initiates a cycle of operation.

It will be recalled, that upon determination of compatibility, the coincidence circuit portion of the servocontrol relay complex, Fig. 6 will energize the relay timer and buffer V308 shown in Fig. 3 which results in energization of the photographic print-out mechanism (300a in Fig. 10B). Specifically, the output from the lamp buffer and timer V308, Fig. 3 is applied to input terminal 221 of the memory cancel timer 200e as shown in Figs. 2 and 10B. The resulting energization of the memory cancel timer 200e insures clearing of both the memory register 200 and programming counter 300 following completion of a print-out.

The manner in which control signals for indexing the prism 1113 in the optical system across the width of the sensitized paper has been briefly described. Such action is analogous to the letter-spacing in a conventional typewriter. To accomplish such result, referring to Fig. 6, the X reverse clutch energizing signal normally manifested at output terminal 631 is also applied through the circuits of diode V601, output terminal 611 and to terminal 1106 in Fig. 11 where it produces momentary energization of a space-indexing solenoid R1100. The space-indexing solenoid R1100 actuates the prism-feed mechanism 1003 (Fig. 10B) of the optical system which includes a conventional ratchet mechanism (not shown), corresponding to one frame space relative to the width of the photosensitive read-out paper.

It has also been stated that a line-feed mechanism 1000 (Fig. 10B) is provided to advance the photosensitized paper upon completion of a line of print-out in conventional typewriter fashion. In addition, a line-space instruction may be required by the programming tape at any time. To accomplish such results, a line-feed relay R711 shown in Fig. 7 is employed. When a line-feed signal is obtained from the line-feed buffer V904 in Fig. 9 through terminal 909 as a result of the previous described action of the line-feed detector, an energization path is completed for the coil of the line-feed relay R711 through terminal 715 in Fig. 7. The resulting actuation of the upper contact of the line-feed clutch contact of the relay R711 establishes an energizing circuit from the plus 100-volt source at terminal 704 to terminal 714 which is connected to the line-feed or paper advance magnetic clutch coil L1131 shown in Fig. 11. The magnetic clutch actuates a conventional paper-feed mechanism to advance the sensitized paper a distance corresponding to one line space as indicated in Fig. 10B. The line-spacing mechanism includes a cam 730 symbolically indicated in Fig. 7 which is reciprocated each time the line-feed mechanism is actuated. Such cam is also shown in Fig. 11 as being mechanically associated with a normally closed switch SW700 which completes a circuit from ground, terminal 1116, Fig. 11, terminal 713, Fig. 7, and the lock-up contacts of the line-feed relay R711. The lock-up contacts provide a holding circuit for the coil of the line-feed relay 711 which can be traced from +300-volt source through the coil of line-feed relay R711 and to ground through the lock-up contacts. The cam 730 is properly phased with respect to the line-feed mechanism so as to open the line-feed switch SW700 upon completion of a line-feed to deenergize the line-feed relay.

*Programming sequence counter and switching matrix 300 (Fig. 3)*

In connection with the preliminary over-all description of the invention it was stated that the various sections of the memory unit were sequentially energized by the action of a programming counter 300. The circuit of the programming counter is detailed in Fig. 3. It has been previously stated that as the tape reader drive mechanism cycles, a pulse-count generator 1001b provided on the shaft 1001a of the tape reader mechanism 1001 (Fig. 10B) initiates timing signals or pulses for subsequently energizing the memory storage register 100. The count-pulses are applied through input terminal 409, Fig. 4, to a pulse shaper 400b the circuit of which comprises tubes V406 and V407 included in Fig. 4. The shaped count-pulses are then applied through output terminal 414, Fig. 4 to terminal 309 of the programming counter and matrix 300 detailed in Fig. 3. Briefly, the mechanism of Fig. 3 is a binary counter and switch which functions to apply the single input sequentially occurring pulses provided by the pulse generator 1001b sequentially to each of the memory storage register sections 100a, 100b, 100c, and 100d. Since the applied pulses occur in order, the correspond to decimal counts and the mechanism of Fig. 3 is essentially a binary counter together with a matrix actuated by such decimal pulses for providing single decimal outputs corresponding to each of the memory register sections. Since such types of converting mechanisms are well known and widely employed in digital circuitry no detailed explanation is considered necessary and the over-all functioning and operation of the circuit of Fig. 3 only will therefore be described. The referred-to pulses applied to input terminal 309 in Fig. 3, produce energization of the bistable devices comprising the tube pairs V301—V302, V303—V304, and V305—V306. A matrix comprising the plurality of state selector resistor networks R301, R302, R303, and R304, shown in Fig. 3 is connected between the bistable devices and the terminals 313, 314, 315, and 316. These terminals are connected to a respective input terminal 116 in each of the four memory sections 100a, 100b, 100c, and 100d (see Fig. 10B). Referring briefly to Fig. 1, it will be recalled that input terminal 116 energizes the grid of the memory unit control tube V100 which determines energization of each memory section previously described. The four-state selector-resistor combinations thereby function to uniquely select the four corresponding decimal digit states corresponding to each of the four, 5-digit store-area locating informational signals; each state selector sequentially and serially providing a ground output signal as is dictated by the referred-to pulse generator 1001b connected to the tape reader mechanism. It will be clear that these ground pulses which are applied through terminal 116 to each of the control tubes V100 in each respective memory section produces the referred-to conditioning or energization of each memory unit. In such manner there is achieved an exact synchronization between the information read step-by-step from the program tape and the information stored in each memory section. Since the pulse generator 1001b in the tape reader mechanism controls the actuation of the programming counter Fig. 3, it will be apparent that the programming counter is timed so as to ready the first section 100a of the memory unit when the first five digit information signal is read from the tape, the second memory section 100b is readied at a time corresponding to the reading of the second five-digit instructional signal from the tape etc.

Over-all summary of operation

Figure 13:
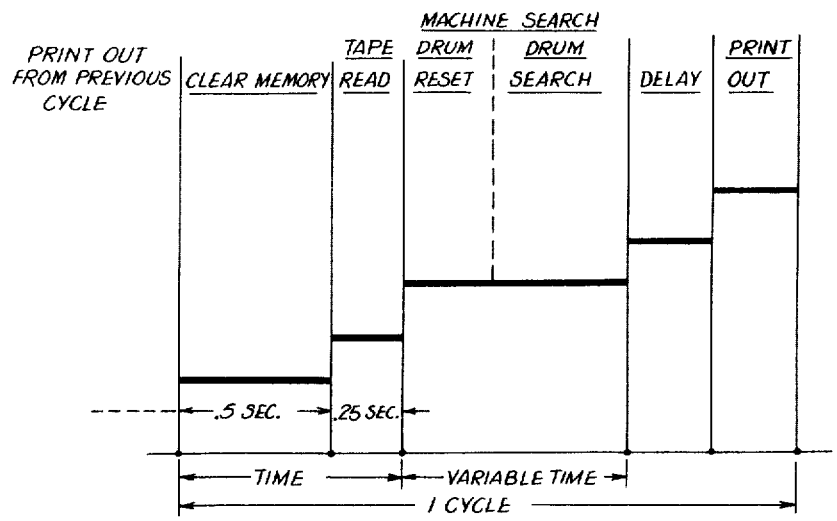
Fig. 13 is a timing diagram showing a typical cycle of operation of the retrieval system.

The construction and operation of the principal features of the apparatus comprising the present invention having been described, the over-all functioning of the information retrieving mechanism can now be reviewed with particular reference to Fig. 10B, as well as the cycle-timer diagram shown in Fig. 13.

Cycling of the machine is in effect controlled by the memory cancel timer 200e whether a single manually initiated cycle is to be performed or automatic sequencing is contemplated. When the manual start switch SW1000 is actuated, the memory cancel timer 200e is energized through terminal 222 as described to deliver a start-tape signal through terminal 220 to input terminal 408 of the cyclical control switch mechanism 400. The resulting triggering of the tube V402 in the cyclical control switch as has been previously described concurrently blocks energization of the search mechanism and initiates a tape advance output signal which is applied through terminal 412 to the tape-drive mechanism 1002. The tape-drive mechanism, it will be recalled, includes the relay R708 in Fig. 7. The tape-drive mechanism 1002 drives the tape reader 1001 which senses the store-area locating instructional signals in step-by-step fashion. It will be recalled that there are four five-digit numbers included in each instructional word. Each of such five-digit groups is applied in sequence to each section 100a–100b of the memory storage register 100 under supervision of the programming sequence counter and switching 300. Specifically, as the tape reader is actuated in step-by-step fashion, the shaft 1001a drives the counter pulse generator 1001b to generate a count pulse as each coded line of the instructional word is read. Such count pulse is transmitted to the count pulse shaper 400b which is included in the same circuit as the cyclical control switch 400 and after shaping the pulse is transmitted from terminal 414 to the program sequence counter.

The programming sequence counter is, as previously pointed out, a switching device for converting the single input series of pulses derived from the count pulse generator into signals for separately and sequentially energizing each of the plurality of output terminals 314, 315, 316, and 312, respectively. As described, the programming counter functions to energize each such terminal in sequence and accordingly each of the memory storage register sections 100a, 100b, 100c, and 100d, are accordingly likewise energized in sequence to receive corresponding five-digit numbers of the instructional word.

The special symbol space-detector code following each instructional word in the programming device is detected by the space detector 200a. The space detector in turn triggers the tube V403 of the cyclical control switch 400. When tube V403 is energized it provides a signal which stops the tape-drive and tape-reader mechanisms and the consequent "start-search" output signal from tube V402 of the bistable device comprising tubes V403 and V402 is applied through terminal 413 to each of the Y and X servocontrol relay complexes 600a—600b. It can be stated that the generation of such start-search signal causes actuation of the search or drum displacing mechanism without regard to the signals which have been stored in the memory storage register 100.

In other words, as previously described, the control effect produced by the servocontrol relay complexes 600a, 600b is to first cause the search or drum displacing mechanism to restore the drum to a near-zero or datum point with reference to the read-out station, following which the drum is advanced in both a Y and X coordinate direction to cause the matrix to be swept out by the read-out lens 1211. Such datum position is represented by the position of the drum in which it energizes the Y and X start switches SW1001, SW1003. It will also be recalled that such search movement of the drum will continue if no coincidence is found until the entire extent of the matrix has been swept out at which point the Y and X limit-stop switches SW1002 and SW1004 will inactivate the search mechanism. As the drum is displaced in a search direction the Y and X code discs 1206a and 1206b are sensed and the signals are applied to the appropriate sections 100a, 100b, 100c, and 100d of the memory storage register 100. When a condition of compatibility has been determined indicating that a desire-store-area has been located the Y and X electronic coincidence detectors 500a, 500b function to control the respective servocontrol relay complexes 600a and 600b to uncouple the Y and X clutches and concurrently apply the Y and X brakes to stop the drum at the selected position. When coincidence in both a Y and X coordinate direction of displacement has been determined, it will be recalled that the servo coincidence mechanism 600c will have been energized and the resulting signal applied from terminal 601 to terminal 311 of the lamp timer 300a, produces after an appropriate delay, energization of the read-out lamp 1210. An exposure is accordingly produced through the optical system including the lens 1211 and prism 1113 on the photosensitive paper. Such action completes an information retrieval cycle, and the machine is ready for a next search cycle. Upon completion of a print-out, the lamp timer 300a will have also applied a signal from terminal 310 to terminal 221 of the memory cancel timer 200e. The memory cancel timer will accordingly function to apply appropriate clear signals to the memory storage register 100 and to the programming sequence counter 300 as previously described. The memory cancel timer, it will be recalled, also functions through terminal 220 and cyclical control switch 400 to initiate a new cycle of operation. The above sequence of operation is further illustrated in the timing program comprising Fig. 13.

Fig. 13 is a timing diagram which clearly outlines the sequence of operation entailed in the determination of a selected store area. Each cycle of the machine has a variable time interval variable since it is obvious that store areas on the storage matrix which are more remote from the origin point than others will require slightly more time to be consumed in the search than store areas closely adjacent to the origin point. Referring to Fig. 13, assuming a print-out from a previous cycle has already been accomplished as indicated by the area to the left of the diagram, the first portion of the cycle will be occupied with a memory-clear operation. It will be recalled from the previous description of the invention that completion of a read-out operation will cause the lamp timer circuit 300a (Fig. 10B) to apply a pulse to the memory cancel timer 200e. Alternatively a signal either from the line-feed detector 200b or carriage-return detector 200c may also initiate the memory cancel timer. The memory cancel timer thereupon functions to apply a memory clear signal to the memory register 100 and a reset signal to the programming sequence counter and matrix 300. The memory cancel timer also functions to apply a start-tape signal to the cyclical control switch 400. Such output of the memory cancel timer occurs in the one-half second time interval indicated in the timing diagram of Fig. 13.

The cyclical control switch 400 when then initiated by the referred-to start-tape signal generated by the memory cancel timer, activates the tape reader drive mechanism 1002 which functions to sequentially in step-by-step fashion sense the store-area locating instructional signals provided in the programming tape and such signals are applied to the memory register sections 100a through 100d. The tape reader functions for the one-quarter second time period indicated in the timing diagram of Fig. 13. It will be recalled that the detection of a special space detector signal on the tape reader by the space detector 200a results in a stop-tape signal being applied to the cyclical control switch 400, which thereupon cuts off the tape-drive mechanism 1002 which actuates the programming tape. Such stop-tape signal also causes the cyclical control switch 400 to generate a start-search signal, such start-search signal being applied concurrently to both the Y servo relay control 600a and the X servo relay control 600b. The search mechanism for displacing the matrix according to its two coordinate directions of movement is thereby initiated as was described in considerable detail. Such variable time intervals in which a machine search operation occurs is indicated in the timing diagram by the variable time interval following completion of the tape-read operation.

The variable time machine search operation is, as indicated in Fig. 13, divided into a drum-reset and a drum-search operation. As was previously described, when the machine has completed a previous store-area read-out operation, the drum, which carries the information storage matrix will be stopped at a particular position relative to the read-out station. A start-search signal functions to first drive the drum in a reverse direction to a datum position point. As was completely described in connection with Fig. 6, when the drum is thus restored to an initial or datum position it is then automatically reversed in direction by the switches SW1003 and SW1001 and displaced in a search direction relative to the read-out station. As previously set forth, a particular store area may or may not be determined during the search cycle, in which event the drum is displaced to the extent of the dimensions of the information matrix and then automatically stopped by the limit switches SW1002 and SW1004. Compatibility between the information provided on the code sensing discs and the store-area locating instructional signals occurring during the search movement of the drum results in the stopping of the drum with the selected store area in registry with the read-out mechanism. To insure accurate printing-out of the selected store area, a delay interval is provided as indicated by the delay period in the timing diagram of Fig. 13. Following such delay period a print-out operation is initiated and the selected store area is recorded on the photosensitive paper by the automatic photo-reproducing mechanism described. The cycle is thereby completed. A subsequent cycle occurs in a similar manner by first initiating clearing of the memory of the previous instructional signal.

What is claimed is:

1. In an information retrieval system, a device for automatically locating discrete prerecorded information store areas on a storage matrix in accordance with programmed store area locating instructions provided in the form of coded digital pulse patterns, comprising a read-out station, a search mechanism for displacing said information storage matrix relative to said read-out station, register means for memorizing said programmed instruction pulse patterns, frame position indentifying means articulated with said search mechanism displacing means defining the spatial position of each store area on said matrix in the form of like-coded digital patterns, a coincidence circuit responsive to said register and said articulated means for generating a control signal upon determination of compatibility between said frame locating instruction and frame position identifying pulses, control means responsive to said coincidence circuit and operatively connected to said search mechanism for determining the orientation of said matrix relative to said read-out station, said control mechanism comprising means for activating said search mechanism in a first direction of matrix displacement, means responsive to an occurrence of said control signal during such displacement for deactivating said search mechanism, means defining the limit of displacement of said matrix in said first direction, said control means including means responsive to said limit defining means for deactivating said search mechanism, means for activating said search mechanism for displacing said matrix in a direction opposite to said first direction, means defining the limits of displacement of said matrix in said opposite direction, said control means including means responsive to said opposite direction limit defining means for activating said search mechanism in said first direction of matrix displacement.

2. The invention of claim 1 including means energized by said control signal during said opposite direction of movement for deenergizing said search mechanism.

3. In an information retrieval system, a device for automatically locating discrete prerecorded information store areas on a storage matrix in accordance with programmed store area locating instructions provided in the form of coded digital pulse patterns, comprising a read-out station, a search mechanism for displacing said information storage matrix relative to said read-out station, register means for memorizing said programmed instruction pulse patterns, frame position identifying means articulated with said search mechanism displacing means defining the spatial position of each store area on said matrix in the form of like-coded digital patterns, a coincidence circuit responsive to said register and said articulated means for generating a control signal upon determination of compatibility between said frame locating instruction and frame position identifying pulses, control means responsive to said coincidence circuit and operatively connected to said search mechanism for determining the orientation of said matrix relative to said read-out station, said control mechanism comprising means for activating said search mechanism in a first direction of matrix displacement, means responsive to an occurrence of said control signal during such displacement for deactivating said search mechanism, said frame position identifying means include synchronizing pulse manifesting means correlated with said frame position identifying means, and means responsive to said synchronizing pulse manifesting means for energizing said coincidence means.

4. The invention of claim 3 including means for spatially offsetting said frame position identifying means and said synchronizing pulse manifesting means relative to said search mechanism an amount corresponding to the stopping inertia of said search mechanism.

5. In an information retrieval system in which information has been prerecorded as discrete store areas on an information storage matrix, the spatial positions of said store areas being defined by geometrical coordinates measured from a common origin, a device for automatically locating discrete prerecorded information store areas on said storage matrix in accordance with programmed store-area locating instructions defining said geometrical coordinates provided in the form of coded digital patterns, comprising: a read-out station, search mechanism for displacing said information storage matrix from a common point of origin relative to said read-out station in directions corresponding to said geometric coordinates, register means for memorizing said geometrical coordinate locating instruction pulse patterns, frame position identifying means articulated with said search mechanism displacing means in each of said coordinate directions, said identifying means defining the spatial coordinate position of each store area relative to said common origin in the form of like-coded digital pulse patterns, coincidence means responsive to said register means and said frame position identifying means for generating coordinate representing control signals upon determination of compatibility between said frame locating instruction and frame position identifying pulses, control means responsive to said coincidence means for activating said search mechanism in first directions from said point of origin and relative to said read-out station corresponding to each of said geometrical coordinates and means responsive to the concurrent occurrence of said control signals during such displacements for deactivating said search mechanism.

6. The invention of claim 5 in which said memory register comprises a multistage register, each stage corresponding to the digits forming a particular instructional code, each stage comprising a memory cell in the form of a capacitor, a first asymmetrical conducting device for channeling a respective digital code pulse to an input terminal on said capacitor, means for selectively connecting the other terminal of said capacitor to a charging circuit, a binary "1" output electron tube, a second binary "1" coincidence asymmetrical conducting device connecting said output tube to said input terminal on the capacitor, whereby the output signal from said output tube normally reflects the charge on said capacitor, and means connecting said frame position defining code signal to said binary "1" coincidence diode to render said coincidence diode conducting.

7. The invention of claim 6 in which said means in each multistage register for selectively connecting the capacitor to a charging circuit comprises a second electron tube one electrode of which is connected to the memory capacitor in each stage of said register, a second electrode connected to ground potential and a control electrode, and cyclically controlled means in said information retrieval system for energizing said control electrode.

8. The invention of claim 7 in which each stage of said multistage register includes a third binary "0" output electron tube, a third binary "0" coincidence asymmetrical conducting device having one electrode connected to the input terminal of the capacitor in each memory cell and a second electrode connected to said binary "0" output tube.

9. In an information retrieval system for automatically locating discrete prerecorded information store areas on a storage matrix upon determination of compatibility between programmed store-area locating instruction signals and store-area location identifying signals, a search mechanism for displacing said information storage matrix relative to a read-out station, said search mechanism comprising motive means, matrix displacing means adapted to be driven by said motive means in either of two directions of displacement relative to said read-out station, selectively energizable clutch means for connecting said motive means to said displacing means for actuation thereof in either of said directions, selectively energizable brake means for holding said matrix displacing means against movement, a first relay for controlling the energization of said clutch means for actuation of said displacing means in a first direction, a second relay for controlling energization of said brake means, circuit means established by said second relay when de-energized for normally energizing said clutch means for actuation of said displacing means in a second of said directions and control means responsive to said condition of compatibility for energizing said second relay.

10. The invention of claim 9 in which said first and second relays each comprises a respective energizing circuit and means included in each of said relay energizing circuits and articulate with the other of said relays for deenergizing a corresponding energizing circuit when said other relay energizing circuit is energized.

11. The invention of claim 10 including a first motion limiting switch connected to said matrix displacing means for energizing said first relay upon completion of a predetermined displacement of said matrix in said second direction.

12. The invention of claim 11 including a second motion limiting switch for energizing said second relay upon completion of a predetermined displacement of said matrix in said first direction.

13. In an information retrieval system for automatically printing out discrete prerecorded information store areas provided on a storage matrix upon determination of compatibility between programmed store-area locating instruction signals and store-area location identifying signals by means of a search mechanism for displacing said storing matrix relative to a read-out station, control means for controlling the displacement of said search mechanism comprising: means for reading said programmed instructional signals, a memory storage register connected to said reading means, cyclical control means for conjointly controlling said reading means and said search mechanism, means responsive to an instructional signal to concurrently stop said reading means and activate said search mechanism, resetting means responsive to a print-out and connected to said cyclical control means and said memory storage register for concurrently stopping said search mechanism, resetting said register and initiating said reading means.

14. The invention of claim 13 in which said memory storage register comprises a plurality of sequentially energizable storage sections, and means connected to said reading means for sequentially energizing each of said storage sections.

15. The invention of claim 14 including an operative connection between said resetting means and said means for sequentially energizing said storage section.

16. The invention of claim 15 in which said means for sequentially energizing each of said storage sections comprise a pulse generator operatively connected to said reading means and means for connecting said generating pulse in sequence to each of said memory storage sections.

References Cited in the file of this patent

UNITED STATES PATENTS

| | | |
|---|---|---|
| 1,366,960 | Schuchardt | Feb. 1, 1921 |
| 2,549,071 | Dusek | Apr. 17, 1951 |